(12) United States Patent
Gilbert et al.

(10) Patent No.: US 11,587,315 B2
(45) Date of Patent: Feb. 21, 2023

(54) APPARATUS AND METHODS FOR AUGMENTED REALITY MEASURING OF EQUIPMENT

(71) Applicants: Deere & Company, Moline, IL (US); Iowa State University Research Foundation, Inc., Ames, IA (US)

(72) Inventors: Stephen Gilbert, Ames, IA (US); Eliot Winer, Ames, IA (US); Jack Miller, Ames, IA (US); Alex Renner, Ames, IA (US); Nathan Sepich, Ames, IA (US); Vinodh Sankaranthi, Urbandale, IA (US); Chris Gallant, Des Moines, IA (US); David Wehr, Redmond, WA (US); Rafael Radkowski, Ames, IA (US); Cheng Song, Ames, IA (US)

(73) Assignee: Deere & Company, Moline, IL (US)

( * ) Notice: Subject to any disclaimer, the term of this patent is extended or adjusted under 35 U.S.C. 154(b) by 71 days.

(21) Appl. No.: 16/880,827

(22) Filed: May 21, 2020

(65) Prior Publication Data
US 2020/0401803 A1     Dec. 24, 2020

Related U.S. Application Data

(60) Provisional application No. 62/863,836, filed on Jun. 19, 2019.

(51) Int. Cl.
*G06V 20/20*     (2022.01)
*G06T 19/00*     (2011.01)
(Continued)

(52) U.S. Cl.
CPC .............. *G06V 20/20* (2022.01); *G06F 3/011* (2013.01); *G06F 3/04815* (2013.01);
(Continued)

(58) Field of Classification Search
None
See application file for complete search history.

(56) References Cited

U.S. PATENT DOCUMENTS

| 9,759,917 B2 | 9/2017 | Osterhout et al. |
| 9,881,276 B2 | 1/2018 | Cohn |
| (Continued) | | |

FOREIGN PATENT DOCUMENTS

| EP | 2953094 | 5/2015 |

OTHER PUBLICATIONS

Ammari et al., "Collaborative BIM-based Markerless Mixed Reality Framework for Facilities Maintenance", ASCE, 2014. (Year: 2014).*

(Continued)

*Primary Examiner* — Nicholas R Wilson
(74) *Attorney, Agent, or Firm* — Hanley, Flight & Zimmerman, LLC

(57) ABSTRACT

Methods, apparatus, systems and articles of manufacture are disclosed for augmented reality measuring of equipment. An example apparatus disclosed herein includes an image comparator to compare camera data with reference information of a reference vehicle part to identify a vehicle part included in the camera data, and an inspection image analyzer to, in response to the image comparator identifying the vehicle part, measure the vehicle part by causing an interface generator to generate an overlay representation of the reference vehicle part on the camera data displayed on a user interface, and determining, based on one or more user inputs to adjust the overlay representation, a measurement corresponding to the vehicle part.

20 Claims, 19 Drawing Sheets

(51) Int. Cl.
  *G06F 3/01*   (2006.01)
  *G06F 3/04815*  (2022.01)
  *G06Q 10/20*   (2023.01)
  *G06T 7/00*   (2017.01)

(52) U.S. Cl.
  CPC .............. *G06Q 10/20* (2013.01); *G06T 7/001* (2013.01); *G06T 7/0006* (2013.01); *G06T 19/006* (2013.01); *G06T 2200/24* (2013.01); *G06V 2201/12* (2022.01)

(56) References Cited

U.S. PATENT DOCUMENTS

| | | | |
|---|---|---|---|
| 10,475,208 | B1 | 11/2019 | Morrison et al. |
| 10,497,108 | B1 | 12/2019 | Knuffman et al. |
| 10,510,142 | B1 | 12/2019 | Dohner et al. |
| 10,530,914 | B2 | 1/2020 | Hoellwarth |
| 11,138,435 | B1 * | 10/2021 | Tan ........................... G06T 7/74 |
| 2005/0267632 | A1 | 12/2005 | Waita |
| 2009/0290757 | A1 | 11/2009 | Mian et al. |
| 2010/0215212 | A1 | 8/2010 | Flakes, Jr. |
| 2013/0265410 | A1 | 10/2013 | Bolt |
| 2014/0071539 | A1 | 3/2014 | Gao |
| 2017/0017667 | A1 | 1/2017 | Chen et al. |
| 2017/0308751 | A1 | 10/2017 | Kim et al. |
| 2018/0150070 | A1 * | 5/2018 | Johnson .................. G06T 7/001 |
| 2018/0150931 | A1 * | 5/2018 | Wagner ................. G06T 19/006 |
| 2018/0260793 | A1 | 9/2018 | Li et al. |
| 2019/0019141 | A1 | 1/2019 | Torii et al. |
| 2020/0175783 | A1 | 6/2020 | Adams |
| 2020/0184724 | A1 | 6/2020 | Schell |
| 2021/0342790 | A1 * | 11/2021 | Dagley ............... G06F 16/7837 |

OTHER PUBLICATIONS

European Patent Office, "Extended European Search Report," issued in connection with EP patent applciation, No. 20181207.0, dated Sep. 10, 2020, 8 pages.
Rune Prytz, "Machine learning methods for vehicle predictive maintenance using off-board and on-board data," Halmstad University, 2014, 96 pages.
Swaminathan et al. "Happy Measure: Augmented Reality for Mobile Virtual Furnishing," Telekom Innovation Laboratories and †Technische Universität Berlin, Apr. 23, 2013, 30 pages.
Google LLC Tools, "Measure Apps on Google Play," retrieved from https://play.google.com/store/apps/details? id=com.google.tango.measure&hl=en_US&gl=US, 1 page.
United States Patent and Trademark Office, "Non Final Office Action," issued in connection with U.S. Appl. No. 16/880,538, dated Jun. 3, 2021, 9 pages.
Regenbrecht et al. "Augmented Reality Projects in the Automotive and Aerospace Industries," IEEE Computing Graphics and Applications, Nov. 2005, (9 pages).
Platonov et al. "A mobile markerless AR system for maintenance and repair," Oct. 22-25, 2006, (4 pages).
European Patent Office, "Extended European Search Report," issued in connection with European patent application No. 20181199.9, dated Sep. 11, 2020, (8 pages).
Patently Apple, "Apple Won 60 Patents Today Covering AirPods Technology and a Major one for Augmented Reality," posted on Sep. 17, 2019, retrieved on Sep. 18, 2019, from https://www.patentlyapple.com/patently-apple/2019/09/apple-won-60-patents-today-covering-airpods-technology-and-a-major-one-for-augmented-reality.html, (6 pages).
Zhou et al., "Applying Spatial Augmented Reality to Facilitate In-Situ Support for Automotive Spot Welding Inspection," The 10th International Conference on Virtual Reality Continuum and its Applications in Industry, Dec. 2011, (6 pages).
Yorimitsu et al., "Augmented Reality By Depth Camera for Image-Based Pipeline Inspection," Journal of Japan Society of Civil Engineers, Ser. F3 (Civil Engineering Informatics), 2016 vol. 72 Issue 2, (10 pages).
Webster et al., "Augmented Reality in Architectural Construction, Inspection, and Renovation," Proceedings of the Third ASCE Congress for Computing in Civil Engineering, Anaheim, CA, pp. 913-919, Jun. 1996, (7 pages).
Shin et al., "Evaluation of Augmented Reality in Steel Column Inspection," Automation in Construction, May 20, 2008, (12 pages).
Caterpillar, "Caterpillar Augmented Reality Inspection Demo," YouTube Video, posted Oct. 22, 2015, accessed May 19, 2020, Retrieved from the Internet: <URL:https://www.youtube.com/watch? v=S8jMgBimuxg.> (1 page).
Videogorillas, "Augmented reality for precise car damage inspection," YouTube Video, posted Oct. 22, 2013, accessed May 19, 2020, Retrieved from the Internet: <URL: retrieved from https://www.youtube.com/watch? v=kENx6zOtQbw> (1 page).
CCC, "CCC Introduces the World's First Artificial Intelligence Estimating Tool," received from https://www.cccis.com/claims/, (10 pages).
European Patent Office, "Communication Pursuant to Article 94(3) EPC", issued in connection with European Patent Application No. 20181199.9 dated Jul. 28, 2021, 4 pages.
European Patent Office, "Communication Pursuant to Article 94(3) EPC", issued in connection with European Patent Application No. 20181207.0 dated Jul. 28, 2021, 4 pages.

* cited by examiner

APPARATUS AND METHODS FOR AUGMENTED REALITY MEASURING OF EQUIPMENT

RELATED APPLICATION

This patent arises from a continuation of U.S. Provisional Patent Application Ser. No. 62/863,836, which was filed on Jun. 19, 2019. U.S. Provisional Patent Application Ser. No. 62/863,836 is hereby incorporated herein by reference in its entirety. Priority to U.S. Provisional Patent Application Ser. No. 62/863,836 is hereby claimed.

FIELD OF THE DISCLOSURE

This disclosure relates generally to augmented reality, and, more particularly, to methods and apparatus for augmented reality measuring of equipment.

BACKGROUND

Augmented reality overlays digital information in the real world. For example, using a user device such as a smart phone or a wearable device such as glasses, a user can view virtual data such as graphical user interface menus, navigation information, virtual characters, etc., where the digital information appears to be integrated into and/or overlaying the real-world environment.

SUMMARY

An example apparatus disclosed herein includes an image comparator to compare camera data with reference information of a reference vehicle part to identify a vehicle part included in the camera data, and an inspection image analyzer to, in response to the image comparator identifying the vehicle part, measure the vehicle part by causing an interface generator to generate an overlay representation of the reference vehicle part on the camera data displayed on a user interface, and determining, based on one or more user inputs to adjust the overlay representation, a measurement corresponding to the vehicle part.

An example non-transitory computer readable storage medium disclosed herein includes computer readable instructions that, when executed, cause a processor to at least compare camera data with reference information of a reference vehicle part to identify a vehicle part included in the camera data, and in response to identifying the vehicle part, measure the vehicle part by generating an overlay representation of the reference vehicle part over the camera data displayed on a user interface, and determining, based on one or more user inputs to adjust the overlay representation, a measurement corresponding to the vehicle part.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
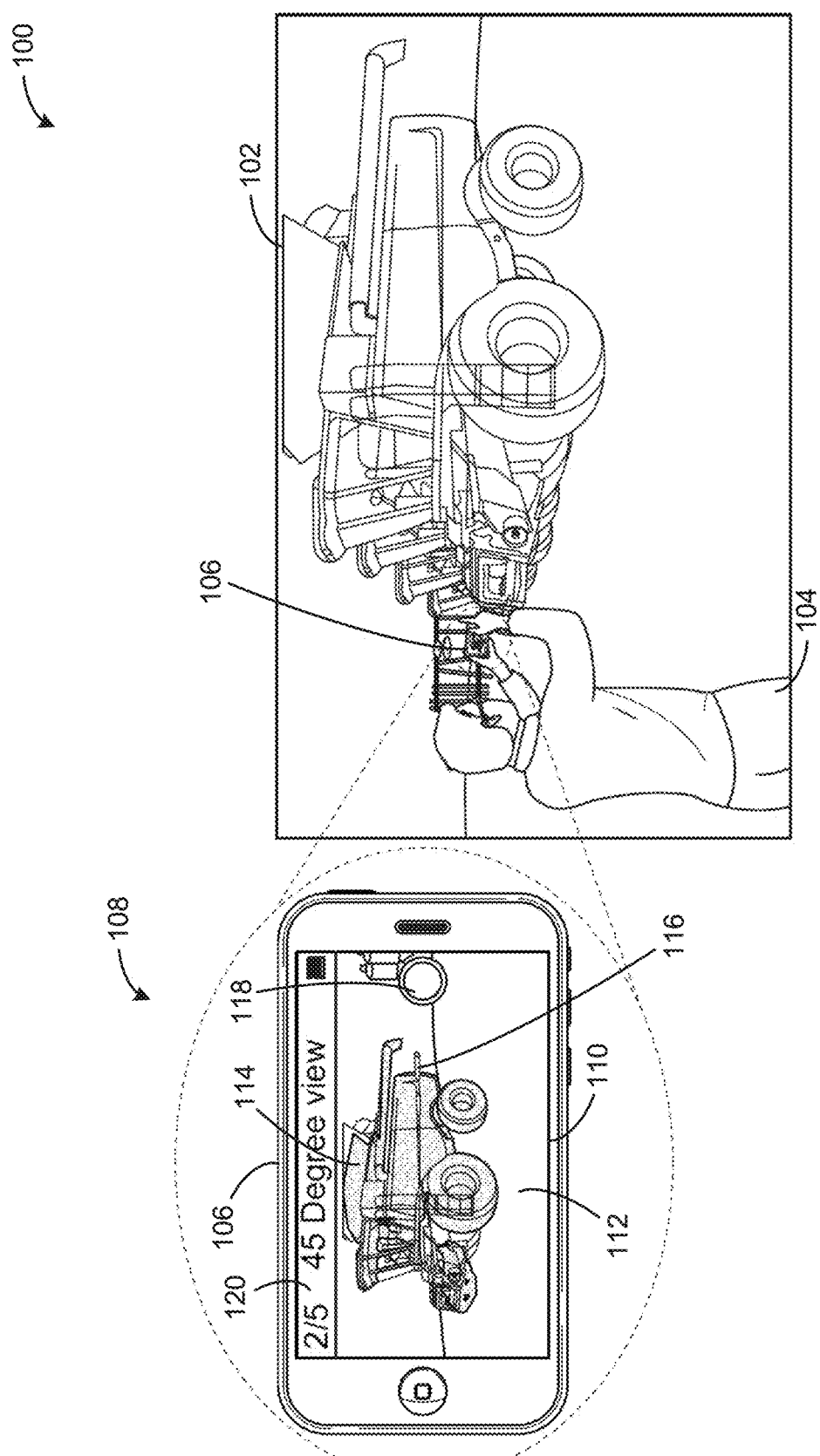
FIG. 1 illustrates an example environment for implementing the augmented reality inspection techniques disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Heavy-duty and/or industrial vehicles (e.g., agricultural vehicles, construction vehicles, forestry vehicles, landscaping vehicles, etc.) are often rented or leased. Before and after a lease or rental period, such vehicles are inspected to assess any damage to the vehicles. For example, a technician may manually visually inspect a vehicle, looking for visual signs of damage on the exterior of the vehicle. The technician may additionally inspect individual parts, such as by measuring a size of a part, or checking for the presence of known parts of the vehicle. With the highly complex nature of these vehicles and vehicle parts, such technicians must be extensively trained to perform these inspections. Further, these inspections are very time consuming. In conventional vehicle inspections, the technician performing the inspection may take notes (e.g., hand-written notes) on any damage they identify. In some examples, the technician may complete a checklist of things to inspect. However, these inspections require that the technicians perform the inspections in-person. Further, these inspections may be highly variable, with some technicians paying more attention to certain viewpoints of the vehicle relative to others. Further, in some conventional implementations, when maintenance needs to be performed or a new part needs to be ordered, a technician must first identify the maintenance problem or part that needs to be replaced and then utilize specialized knowledge to perform maintenance and/or order a replacement part.

Example methods, apparatus, systems, and articles of manufacture (e.g., physical storage media) for augmented reality measuring of equipment are disclosed herein. Augmented reality can be utilized to overlay digital information on a camera image or other representation of the real-world to enable a user to perform equipment inspection. For example, in some augmented reality implementations, a user wears glasses which have an embedded display technology that enables digital information to be displayed and hence be embedded in the user's view of the real world. In other examples, a user may utilize a camera on a mobile device (e.g., a smart phone, a tablet, etc.) to view the world, and the mobile device may overlay the digital information on a display of the device. Example methods, apparatus, systems, and articles of manufacture disclosed herein utilize augmented reality to enable a guided inspection process that can be performed by anyone (e.g., not requiring highly trained technicians) with a high degree of repeatability and reliability.

Example techniques disclosed herein enable an inspection profile to be generated indicating one or more inspection locations and points of view for inspection photos to be captured. In some example techniques disclosed herein, inspection profiles are generated at a first device (e.g., at a vehicle rental company, at an insurer, at a maintenance facility, etc.) and are transmitted to a second device (e.g., a mobile device of an operator of the vehicle) to guide a vehicle inspection and/or vehicle part inspection. In some such examples, the inspection profiles are generated at the first device via a user interface displaying a model of the vehicle to be inspected, and enabling a user to select locations at which photos should be captured. In some such examples, the user can view a projection of what an image captured at a selected location and aimed at a particular point of interest would look like. In some examples, a user may generate a single profile to be utilized for numerous inspections of a same vehicle, thereby enabling consistent inspection images between inspections of the same type of vehicle. In some example techniques disclosed herein, location information is stored in a camera-independent format, enabling individual mobile devices (e.g., which may have cameras with different focal lengths and other properties) to individually determine device-specific location coordinates at the mobile device.

Example methods, apparatus, systems, and articles of manufacture disclosed herein utilize inspection profiles to perform reliable and repeatable inspections via a mobile device (e.g., a smart phone, an augmented reality/virtual reality headset, a digital camera, etc.). In some example methods, apparatus, systems, and articles of manufacture disclosed herein, the inspection profile is utilized in conjunction with location information and camera data to guide a user (e.g., via augmented reality overlay symbols) to inspection locations represented in the inspection profile and to orient the camera position according to the inspection profile. In some example techniques disclosed herein, the mobile device indicates when the camera is properly positioned (e.g., via an overlay indication) and instructs the user to capture an image. The images captured during the inspection may be appended with annotations input by a user, and/or other relevant metadata (e.g. location data relative to the vehicle, absolute location data, etc.). In some examples, the resulting inspection images can be utilized to determine the condition of the vehicle, such as to appraise the vehicle for sale or lease. In some examples, the inspection images can be analyzed to identify wear or damage to parts, and/or missing parts. In some examples, the inspection images are uploaded to be analyzed by an expert. Due to the highly repeatable nature of the inspection images, an inspector (e.g., at a separate location) can perform efficient and fast inspections based on the collected images, and can perform these inspections without needing to be physically present at the location of the vehicle. In some examples disclosed herein, a user can provide inspection photographs to a third-party (e.g., a dealer, a service technician, an insurer, a vehicle owner, a maintenance entity, etc.) for a remote assessment of the vehicle condition (e.g., for repair estimates, maintenance reports, etc.). In some examples, a farmer may utilize the methods, apparatus, systems, and articles of manufacture disclosed herein to inspect and maintain one or more vehicles.

Example methods, apparatus, systems, and articles of manufacture disclosed herein enable a user at a mobile device to perform an individual part inspection guided by augmented reality. In some example techniques disclosed herein, a part can be measured and/or otherwise analyzed to determine a state of a part. For example, a dimension (e.g., diameter, radius, tread depth, thickness, etc.) of a tire can be utilized to determine an amount of wear, an approximate remaining lifespan of the tire, etc. In some examples, a user can utilize controls on a display of the mobile device to adjust augmented reality overlays to enable the system to measure vehicle parts. In some example techniques disclosed herein, an amount of wear or use can be determined by comparing a past state (e.g., past inspection data) of a vehicle or a vehicle part with a current state (e.g., current inspection data) or reference state (e.g., inspection data from a new vehicle). Such wear and/or usage data can be utilized to generate a maintenance alert (e.g., make recommendations on maintenance procedures to be performed and/or parts to be replaced). In some examples, data corresponding to wear and/or usage can be correlated with usage metrics (e.g., operating distance traveled, operating hours logged, etc.) to enable predictive analytics (e.g., based on analysis of vehicles of the same type, can predict how much wear the tires will experience in the next five thousand miles).

In some example methods, apparatus, systems, and articles of manufacture disclosed herein, a user can detect a vehicle in a camera view on a mobile device by aligning an outline of a model of the vehicle (e.g., an overlay representation corresponding to the shape of the vehicle) with the vehicle in the camera view and thereafter access a full model of the vehicle. In some such examples, the user can manipulate the full model of the vehicle to select vehicle parts and thereby obtain information (e.g., specifications, links to purchase replacements, maintenance procedures, etc.) corresponding to the vehicle part.

FIG. 1 illustrates an example environment 100 for implementing the augmented reality inspection techniques disclosed herein. The example environment 100 includes an example vehicle 102, and an example user 104 holding an example mobile device 106.

The example vehicle 102 of the illustrated example of FIG. 1 is a combine. In some examples, the vehicle 102 being inspected utilizing techniques disclosed herein may be a tractor, a plow, a cultivator, a sprayer, a trowel, a harvester, a construction truck, a personal vehicle, a lawn mower, and/or any other type of vehicle.

The example mobile device 106 of the illustrated example of FIG. 1 is a mobile phone. The mobile device 106 may be any device including and/or connected with a camera. For example, the mobile device 106 can be a tablet, a laptop, a virtual/augmented reality headset, a computer, a digital camera, etc. In the illustrated example of FIG. 1, the user 104 is standing with the mobile device 106 pointed at the vehicle 102 to conduct an inspection.

FIG. 1 includes an example detail view 108 of an example display 110 of the mobile device 106. In the illustrated example of FIG. 1, the display 110 is integrated into the mobile device 106. In some examples, the display 110 may be part of a headset or integrated into glasses. In the illustrated example of FIG. 1, the display 110 illustrates an example camera view 112. The example camera view 112 corresponds to a view (e.g., in substantially real-time) captured by a camera on the mobile device 106 (e.g., on the side of the mobile device 106 opposite the display 110).

Utilizing example techniques disclosed herein, the display 110 includes an example vehicle overlay 114, represented by shading. The vehicle overlay 114 is applied on top of the camera view 112, and represents an outline of a model of the vehicle 102. For example, the vehicle overlay 114 may be an outline and/or an area corresponding to a model of the vehicle 102. As the user 104 moves the mobile device 106, the vehicle overlay 114 remains in the same relative position on the display 110 (e.g., centrally disposed on the display 110), and thus the user 104 can move the mobile device 106 to align the vehicle overlay 114 with the vehicle 102 in the camera view 112. In some examples, once the vehicle overlay 114 has been aligned with the vehicle 102 (e.g., and thus the location of the vehicle 102 has been identified by the mobile device 106), an inspection procedure can be initiated by directing the user 104 to navigate to an inspection location. In some such examples, when the user 104 arrives at the inspection location and directs the camera on the mobile device 106 at the vehicle 102, the vehicle overlay 114 can be displayed along with an indication of whether the camera has been appropriately aligned. For example, if the vehicle overlay 114 is a first color (e.g., red), the user 104 may continue to adjust the position of the camera, whereas if the vehicle overlay 114 is a second color (e.g., green), the user 104 is in the correct position and may capture an inspection photo.

The example display 110 of the illustrated example of FIG. 1 includes an example line-of-sight overlay 116 to guide the user 104 to move the mobile device 106 to the correct inspection location. For example, in the illustrated example of FIG. 1, the line-of-sight overlay 116 extends from a central region of the vehicle overlay 114 to a location on the right-side (e.g., as viewed on the page) of the display 110, indicating that the user 104 should move the mobile device 106 to the right (e.g., the user 104 should take one or more steps to their right). The line-of-sight overlay 116 is illustrated as a dashed line in FIG. 1.

The example display 110 of the illustrated example of FIG. 1 illustrates an example capture button 118 that, when selected (e.g., pressed), captures an inspection image. In some examples, the capture button 118 may only be available (e.g., visible) on the display 110 when the vehicle overlay 114 has been aligned with the camera view 112 of the vehicle 102 in the correct location (e.g., at the inspection location).

The example display 110 of the illustrated example of FIG. 1 includes an example capture label 120 illustrating a view label for the current inspection image to be captured. In the illustrated example, the capture label 120 reads "2/5," indicating that the second image of five inspection images is being captured, as well as "45 Degree View," indicating that the current inspection image is a forty-five degree angle view of the vehicle. In some examples, the labels are included in the inspection profile received at the mobile device 106 (e.g., received from a server, received from an inspection manager device, etc.). In some examples, the user 104 may input labels for inspection images captured (e.g., by entering an annotation after capturing an image, by entering an annotation before capturing an image, etc.).

Detailed illustrations of the techniques to perform a vehicle inspection and/or a vehicle part inspection utilizing the techniques disclosed herein are further illustrated and described in connection with FIGS. 10A-J and 11A-E.

Figure 2:
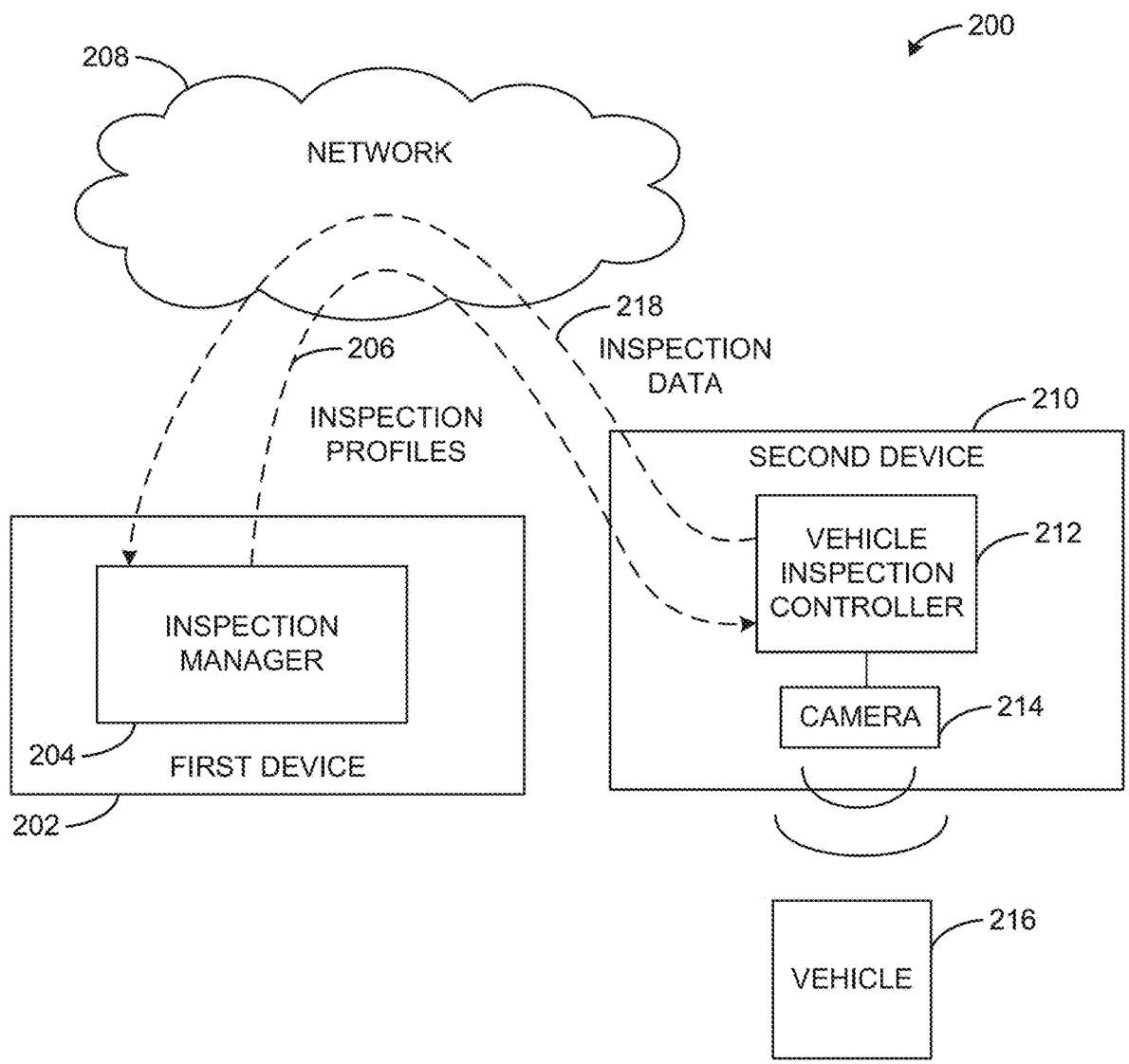
FIG. 2 is a block diagram of an example system for augmented reality inspection constructed in accordance with techniques disclosed herein.

FIG. 2 is a block diagram of an example system 200 for augmented reality inspection constructed in accordance with techniques disclosed herein. The example system 200 includes an example first device 202, an example inspection manager 204, example inspection profiles 206, an example network 208, an example second device 210, an example vehicle inspection controller 212, an example camera 214, an example vehicle 216, and example inspection data 218.

The example first device 202 of the illustrated example of FIG. 2 includes the example inspection manager 204. In some examples, the first device 202 is a computing device including the inspection manager 204 to generate inspection profiles. In some examples, the first device 202 is located at a maintenance facility, at a vehicle rental facility, at a vehicle dealership, etc. The first device 202 can be any type of computing device. In some examples, the first device 202 and the second device 210 may be one computing device, wherein a user can utilize the inspection manager 204 to configure an inspection profile and then execute the inspection according to the inspection profile on the same device.

The example inspection manager 204 of the illustrated example of FIG. 2 generates inspection profiles and accesses inspection data in accordance with techniques disclosed herein. The inspection manager 204 communicates the inspection profiles 206 to the vehicle inspection controller 212 of the second device 210. In some examples, the inspection manager 204 accesses inspection data 218 (e.g., inspection images, vehicle condition analyses, etc.) from the vehicle inspection controller 212. In some examples, the inspection manager 204 communicates inspection profiles 206 via the network 208 (e.g., the Internet). The inspection manager 204 is illustrated and described in further detail in connection with FIG. 3.

The example inspection profiles 206 of the illustrated example of FIG. 2 include data corresponding to inspections to be performed. For example, the inspection profiles 206 can include a vehicle type or part type to be inspected, one or more inspection locations, metadata corresponding to the inspection to be performed (e.g., a deadline, instructions on where the inspection data should be sent, etc.), and/or any other data to enable a vehicle inspection. In some examples, the inspection profiles 206 are stored in the cloud (e.g., the network 208) and can be retrieved by one or more mobile devices to conduct inspections. For example, a user with a mobile device can connect to the cloud and select, based on a type of vehicle to be inspected and/or a type of vehicle part to be inspected, a corresponding inspection profile that will guide them through an inspection procedure. In some examples, ones of the inspection profiles 206 correspond to whole vehicle inspections, individual part inspections, and/ or other common procedures.

The example network 208 of the illustrated example of FIG. 2 is the Internet. However, the example network 208 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 208 enables the inspection manager 204 to be in communication with the vehicle inspection controller 212 and the first device 202 to be in communication with the second device 210. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

The example second device 210 of the illustrated example of FIG. 2 is a mobile device. For example, the second device 210 may be a smart phone, a tablet, a laptop, a digital camera, and/or any other type of mobile device. The second device 210 includes the example vehicle inspection controller 212 and the example camera 214. The second device 210 of the illustrated example includes transmission technologies (e.g., a wireless adapter, Bluetooth adapter, etc.) to communicate with the first device 202.

The vehicle inspection controller 212 of the illustrated example of FIG. 2 guides and/or controls vehicle inspections utilizing the second device 210. The vehicle inspection controller 212 accesses one or more of the inspection profiles 206 (e.g., via the network 208) and guides and/or controls a vehicle inspection. For example, the vehicle inspection controller 212 can provide on-screen instructions utilizing augmented reality to instruct a user of the second device 210 to move to one or more of a plurality of inspection locations and capture inspection images. In some such examples, the vehicle inspection controller 212 communicates the inspection images as part of the inspection data 218 to the inspection manager 204 (e.g., via the network 208). The vehicle inspection controller 212 is illustrated and described in detail in connection with FIG. 4.

The example camera 214 of the illustrated example of FIG. 2 captures inspection images. For example, the camera 214 can capture inspection images of the vehicle 216. In some examples, the camera 214 is integrated in the second device 210. In some examples, the camera 214 is separate from, but in communication with, the second device 210. The camera 214 of the illustrated example communicates inspection images to the vehicle inspection controller 212.

The vehicle 216 of the illustrated example of FIG. 2 is equipment to be inspected. The vehicle 216 may be a construction vehicle, an agricultural vehicle, a personal vehicle, a municipal vehicle, etc. In some examples, instead of a vehicle, the vehicle inspection controller 212 can guide an inspection of other equipment (e.g., a power generator, a pump, an engine, etc.). As used herein, the term "vehicle" includes other equipment (e.g., a power generator, a pump, an engine, etc.) in addition to conventional vehicles.

The inspection data 218 of the illustrated example of FIG. 1 is data corresponding to an inspection performed on the second device 210. For example, the inspection data 218 may include inspection images, part analysis, vehicle condition analysis, and/or any other data collected during an inspection. In the illustrated example, the inspection data 218 is communicated to the inspection manager 204 via the network 208. In some examples, the inspection data 218 is additionally or alternatively stored at the second device 210.

Figure 3:
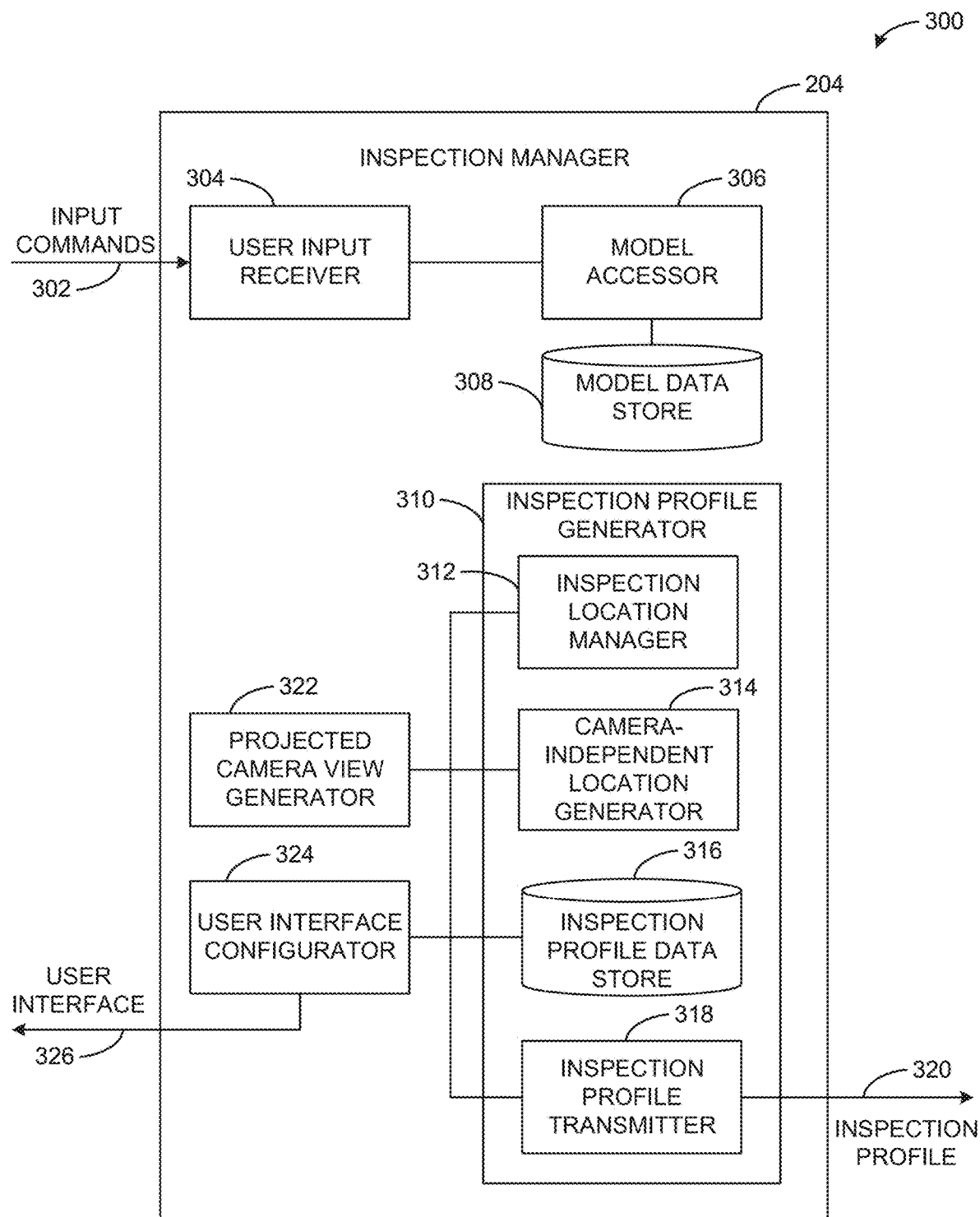
FIG. 3 is a block diagram of an example inspection manager of the system of FIG. 2.

FIG. 3 is a block diagram of an example inspection manager 204 of the system 200 of FIG. 2. The inspection manager 204 includes an example user input receiver 304, an example model accessor 306, an example model data store 308, an example inspection profile generator 310, an example inspection location manager 312, an example camera-independent location generator 314, an example inspection profile data store 316, an example inspection profile transmitter 318, an example projected camera view generator 322, and an example user interface configurator 324.

The example input commands 302 of the illustrated example of FIG. 3 are commands from a user, received by the user input receiver 304. The input commands 302 may be input via interactions with an example user interface 326 (e.g., using a touch-screen to interact with the user interface 326, using an input device, etc.). The input commands 302 may represent a selection of an inspection location, an entry of one or more parameters corresponding to an inspection location, metadata corresponding to an inspection, a selection of a type of vehicle and/or vehicle part, and/or any other selections made available on the user interface 326.

The example user input receiver 304 of the illustrated example of FIG. 3 accesses the input commands 302 and initiates actions based on the input commands 302. For example, one of the input commands 302 indicates that a new inspection location should be created, the user input receiver 304 can cause the inspection location manager 312 to initiate a new inspection location based on information in the one of the input commands 302. As another example, if one of the input commands 302 indicates a type of vehicle to be utilized for generating an inspection profile, the user input receiver 304 can cause the model accessor 306 to retrieve a vehicle model associated with the type of vehicle to be retrieved from the model data store 308. In some examples, the user interface configurator 324 updates the user interface 326 in response to the input commands 302.

The example model accessor 306 of the illustrated example of FIG. 3 accesses models of vehicles from the model data store 308 and/or another accessible storage location (e.g., a cloud storage location). In some examples, the model accessor 306 accesses complex models of vehicles and simplifies them based upon the features necessary to be included in a model corresponding to an inspection profile. In some examples, the models of vehicles are referred to as reference information of reference vehicles. For example, the model accessor 306 accesses reference information of a reference vehicle including information corresponding to features of the reference vehicle. Such information includes, size, dimension, weight, shape, number of parts, type of material, type of tires, manufacturer, year made, vehicle make and model, etc. In some examples, the model accessor 306 accesses the vehicle models from a location that is accessible to both the model accessor 306 of the inspection manager 204 and the model manager 412 of the vehicle inspection controller 212. In some examples, the model accessor 306 communicates vehicles models to the user interface configurator 324 to display the vehicle model on the user interface 326 (e.g., thereby enabling a user to establish inspection locations surrounding the vehicle model on the user interface 326).

The example model data store 308 of the illustrated example of FIG. 3 stores vehicle models. In some examples, the model data store 308 is a location external to the inspection manager 204 (e.g., elsewhere on the first device 202, accessible via the network 208, etc.). The model data store 308 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The model data store 308 may additionally or alternatively be implemented by one or more double data rate (DDR) memories, such as DDR, DDR2, DDR3, mobile DDR (mDDR), etc. The model data store 308 may additionally or alternatively be implemented by one or more mass storage devices such as hard disk drive(s), compact disk drive(s) digital versatile disk drive(s), etc. While in the illustrated example the model data store 308 is illustrated as a single database, the model data store 308 may be implemented by any number and/or type(s) of databases. Furthermore, the data stored in the model data store 308 may be in any data format such as, for example, binary data, comma delimited data, tab delimited data, structured query language (SQL) structures, etc.

The example inspection profile generator 310 of the illustrated example of FIG. 3 generates an example inspection profile 320. The inspection profile generator 310 includes the example inspection location manager 312, the example camera-independent location generator 314, the example inspection profile data store 316, and the example inspection profile transmitter 318.

The example inspection location manager 312 of the illustrated example of FIG. 3 modifies inspection locations based on the input commands 302. For example, if the input commands 302 indicate a new inspection location should be initiated, the inspection location manager 312 initiates an inspection location based on parameters associated with the input commands 302. In some examples, the camera-independent location generator 314 determines the camera-independent location coordinates to be stored in the inspection profile 320 for the inspection location. In some such examples, the inspection location manager 312 accesses the camera-independent location coordinates from the camera-independent location generator 314 and stores them in an inspection profile. In some examples, if the input commands 302 indicate that an inspection location should be edited or deleted, the inspection location manager 312 modifies the inspection locations in accordance with the input commands 302. In some examples, modifications to an inspection location are processed by the camera-independent location generator 314 to generate updated camera-independent location coordinates to be stored in the inspection profile 320.

In some examples, the inspection profile (e.g., including one or more inspection locations) is stored in the inspection profile data store 316 and/or another location accessible to the inspection profile generator 310 (e.g., a location accessible via the network 208). In some examples, in response to the input commands 302 indicating that an inspection profile is completed, the inspection location manager 312 can store the inspection profile in the inspection profile data store 316 and/or trigger transmission of the inspection profile 320 to the vehicle inspection controller 212 of FIGS. 2 and 4.

The example camera-independent location generator 314 generates camera-independent location coordinates to be stored in the inspection profile 320 for an inspection location. Utilizing camera-independent location coordinates enables location information to be stored in a manner that can be utilized by the vehicle inspection controller 212 to take consistent photos regardless of the characteristics of the camera 214 utilized to capture inspection images. For example, by generating camera-independent location coordinates, the camera-independent location generator 314 enables a first camera with a first focal length to capture a first inspection image that looks similar (if not identical) to a second inspection image captured on a second camera with a second focal length. Since there are numerous types of mobile devices, often with different types of cameras, storing camera-independent location information in the inspection profile 320 makes the inspection images that are taken based on the inspection profile 320 highly repeatable between different devices.

The camera-independent location generator 314 of the illustrated example of FIG. 3 generates camera-independent location coordinates by storing a point of interest on the vehicle model, a direction vector extending from the point of interest, and a width of interest for the inspection location. The camera-independent location generator 314 of the illustrated example of FIG. 3 stores a point of interest on the vehicle model, for example, by storing a point in space on the vehicle model (e.g., a three-dimensional coordinate corresponding to a location on the vehicle model). The camera-independent location generator 314 of the illustrated example of FIG. 3 stores a direction vector extending from the point of interest to a photographer location (e.g., a location selected on the user interface around the vehicle model). In some examples, the direction vector is normalized in the object coordinate frame. The camera-independent location generator 314 of the illustrated example of FIG. 3 stores a width of interest for the inspection location, corresponding to an amount of area around the point of interest that is desired to be included in the inspection image. In some examples, the width of interest corresponds to a minimum width dimension that should be included in an inspection image. By storing the width of interest, the vehicle inspection controller 212 can determine an appropriate location for a specific camera when performing an inspection (e.g., if a camera has a small angular field of view, a user may need to stand further from the vehicle to capture the width of interest relative to another camera with a larger angular field of view).

In some examples, the input commands 302 may explicitly indicate one or more of the point of interest, a direction vector, or the width of interest for the inspection location. In other examples, one or more of the parameters may be inferred and/or calculated by the camera-independent location generator 314. For example, if the user interface 326 enables a user to select a location on the ground and then, via the projected camera view generator 322, view and adjust a projected image of the vehicle from this location, the camera-independent location generator 314 of the illustrated example of FIG. 3 may calculate the point of interest and the width of interest based upon the projected camera view that was displayed on the user interface 326 when the user selected the inspection location. In some examples, the width of interest is determined based on a width on the vehicle model that must be captured to obtain a photo similar to the projected view generated by the projected camera view generator 322.

In some examples, dimensions (e.g., camera-independent location coordinates) are stored with units corresponding to those of the vehicle model and/or as relative dimensions to a reference point on the vehicle model (e.g., a center point of the vehicle model). In some examples, the dimensions corresponding to inspection locations are adjusted (e.g., scaled) at the vehicle inspection controller 212 (e.g., at the device-specific location translator 406) to correspond to the actual vehicle, as opposed to the vehicle model.

The example inspection profile data store 316 stores inspection profiles. The inspection profiles include the camera independent location coordinates from the camera-independent location generator 314. The inspection profile data store 316 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The inspection profile data store 316 may additionally or alternatively be implemented by one or more double data rate (DDR) memories, such as DDR, DDR2, DDR3, mobile DDR (mDDR), etc. The inspection profile data store 316 may additionally or alternatively be implemented by one or more mass storage devices such as hard disk drive(s), compact disk drive(s) digital versatile disk drive(s), etc. While in the illustrated example the inspection profile data store 316 is illustrated as a single database, the inspection profile data store 316 may be implemented by any number and/or type(s) of databases. Furthermore, the data stored in the inspection profile data store 316 may be in any data format such as, for example, binary data, comma delimited data, tab delimited data, structured query language (SQL) structures, etc.

The example inspection profile transmitter 318 of the illustrated example of FIG. 3 communicates the inspection profile 320 to the vehicle inspection controller 212. In some examples, the inspection profile transmitter 318 communicates the inspection profile 320 to a storage location on the network 208, to be retrieved as necessary at the second device 210.

The example projected camera view generator 322 of the illustrated example of FIG. 3 generates projections (e.g., predictions, estimates, etc.) of the inspection image that would result from capturing an image at a current inspection location (e.g., an inspection location selected on the user interface 326). Examples of projected images are illustrated in FIGS. 9A-9D. The projected camera view generator 322 displays projected inspection images of the vehicle model based on the camera-independent location coordinates determined by the camera-independent location generator 314 from the input commands 302. In some examples, the projected camera view generator 322 displays projected inspection images based on a selected camera property or mobile device type. For example, the projected camera view generator 322 may be configured based on the input commands 302 to display projected inspection images as if they are taken on a specific type of smart phone. Therefore, if an inspector configuring an inspection profile has knowledge of the type of mobile device that will perform the inspection, this information can be provided to the projected camera view generator 322 to ensure the projected inspection images are specific to the characteristics of the mobile device (e.g., specific to the focal length of the camera). In some examples, the projected camera view generator 322 provides the projected camera view(s) to the user interface configurator 324 to be displayed on the user interface 326.

The user interface configurator 324 generates the user interface 326 to be displayed on a display of the first device 202. In some examples, the model accessor 306 communicates a vehicle model to display on the user interface. In some examples, the user input receiver 304 communicates the input commands 302 to the user interface configurator 324 to cause adjustments to the user interface 326 (e.g., rotate the vehicle model, zoom-in on the vehicle model, etc.). In some examples, the projected camera view generator 322 communicates projected inspection image(s) to the user interface configurator 324 to be displayed on the user interface 326.

Figure 4:
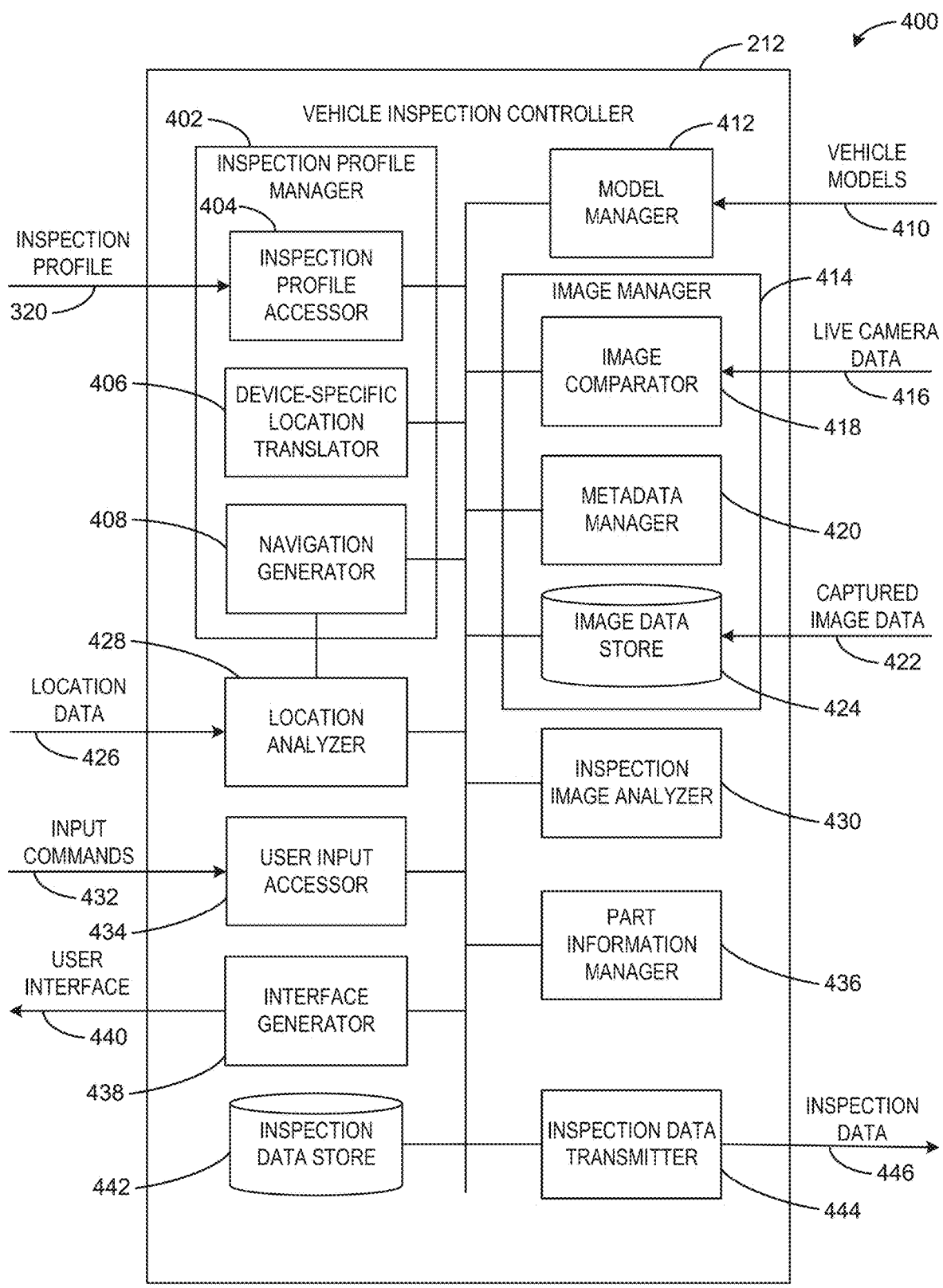
FIG. 4 is a block diagram of an example vehicle inspection controller of the system of FIG. 2.

While an example manner of implementing the inspection manager 204 of FIG. 2 is illustrated in FIG. 3, one or more of the elements, processes and/or devices illustrated in FIG. 3 may be combined, divided, re-arranged, omitted, eliminated and/or implemented in any other way. Further, the example user input receiver 304, the example model accessor 306, the example model data store 308, the example inspection profile generator 310, the example inspection location manager 312, the example camera-independent location generator 314, the example inspection profile data store 316, the example inspection profile transmitter 318, the example projected camera view generator 322, the example user interface configurator 324 and/or, more generally, the example inspection manager 204 of FIG. 3 may be implemented by hardware, software, firmware and/or any combination of hardware, software and/or firmware. Thus, for example, any of the example user input receiver 304, the example model accessor 306, the example model data store 308, the example inspection profile generator 310, the example inspection location manager 312, the example camera-independent location generator 314, the example inspection profile data store 316, the example inspection profile transmitter 318, the example projected camera view generator 322, the example user interface configurator 324 and/or, more generally, the example inspection manager 204 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user input receiver 304, the example model accessor 306, the example model data store 308, the example inspection profile generator 310, the example inspection location manager 312, the example camera-independent location generator 314, the example inspection profile data store 316, the example inspection profile transmitter 318, the example projected camera view generator 322, and/or the example user interface configurator 324 is/are hereby expressly defined to include a non-transitory computer readable storage device or storage disk such as a memory, a digital versatile disk (DVD), a compact disk (CD), a Blu-ray disk, etc. including the software and/or firmware. Further still, the example inspection manager 204 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events FIG. 4 is a block diagram of an example vehicle inspection controller 212 of the system of FIG. 2. The vehicle inspection controller 212 includes an example inspection profile manager 402, an example inspection profile accessor 404, an example device-specific location translator 406, an example navigation generator 408, an example model manager 412, an example image manager 414, an example image comparator 418, an example metadata manager 420, an example image data store 424, an example location analyzer 428, an example inspection image analyzer 430, an example user input accessor 434, an example part information manager 436, an example interface generator 438, an example inspection data store 442, and an example inspection data transmitter 444.

The inspection profile manager 402 of the illustrated example of FIG. 4 accesses and utilizes inspection profiles (e.g., the inspection profile 320). The inspection profile manager 402 of the illustrated example of FIG. 4 includes the inspection profile accessor 404, the device-specific location translator 406, and the navigation generator 408.

The inspection profile accessor 404 of the illustrated example of FIG. 4 accesses the inspection profile 320. In some examples, the inspection profile accessor accesses the inspection profile 320 in response to example input commands 432 indicating a user has requested an inspection profile. For example, a user may select, on an example user interface 440, to initiate an inspection for a vehicle type (e.g., a user may select a specific vehicle model, a type of vehicle, other parameter associated with equipment to be inspected, etc.). The inspection profile accessor 404 may access the inspection profile 320 from the network 208 or another storage location accessible to the vehicle inspection controller 212. In some examples, one or more inspection profiles may be stored locally at the vehicle inspection controller 212 (e.g., to be quickly retrieved or accessed without a network connection).

The device-specific location translator 406 of the illustrated example of FIG. 4 converts camera-independent location data represented in the inspection profile 320 to device-specific location data. The device-specific location translator 406 ensures consistent photographs according to the inspection profile. For example, the photographs can be considered consistent if (1) the object of interest is located at approximately the same location in both photos, (2) the object of interest is approximately the same size in both photos, and (3) the object of interest has the same orientation in both photos. In some examples, the device-specific location translator 406 accesses one or more of three location coordinates: (1) a point of interest location (e.g., an x, y, z coordinate in an object coordinate frame representing a point to be at the center of the photograph), (2) a direction vector (e.g., a vector extending from the point of interest to a photographer location), and/or (3) a width of interest (e.g., a dimension of the horizontal area around the point of interest to be captured in the photograph). In some examples, in addition to accessing the camera-independent location coordinates, the device-specific location translator 406 accesses a focal length of the camera (e.g., the camera 214), a minimum height of acceptable camera location, and/or a maximum height of acceptable camera location. The minimum height of acceptable camera location is limited by the ground, while the maximum height of acceptable camera location is limited by a maximum height that can be reached by the user. In some examples, the average arm-span length of a user and height of a user is utilized to calculate a maximum height of an acceptable camera location. In some examples, the focal length of the camera can be defined in terms of an angular field of view.

The device-specific location translator 406 utilizes the point of interest, the direction vector, the width of interest, the focal length, and/or the minimum and maximum acceptable height dimensions to determine a device-specific location at which an inspection image should be captured. Any technique to determine a device-specific (e.g., camera-specific) location for the inspection image can be utilized. As one example procedure, the device-specific location translator 406 may utilize the following equations 1-9 to calculate the device-specific location:

$$g' = \langle v_x, 0, v_z \rangle \qquad \text{Equation 1}$$

Equation 1 can be utilized to calculate horizontal components of the desired photo angle, where g represents a ground vector and v represents a vector from the interest point to the optimal camera location.

$$\hat{g} = \frac{g}{\|g\|} \qquad \text{Equation 2}$$

Equation 2 can be utilized to normalize the vector of the horizontal components of the desired photo angle.

$$\hat{\theta} = \sin^{-1}(v_y) \qquad \text{Equation 3}$$

Equation 3 can be utilized to calculate the optimal vertical angle for the camera location.

$$d = \frac{w}{2*\tan\left(\frac{f}{2}\right)} \qquad \text{Equation 4}$$

Equation 4 can be utilized to calculate the required distance from the point of interest to the camera (d) to capture a desired width, where f corresponds to the focal length or angular field of view, and w corresponds to the desired width of interest at the point of interest.

$$\theta_l = \sin^{-1}\left(\frac{h_l - p_y}{d}\right) \qquad \text{Equation 5}$$

$$\theta_u = \sin^{-1}\left(\frac{h_u - p_y}{d}\right) \qquad \text{Equation 6}$$

Equations 5 and 6 can be utilized to calculate the minimum and maximum allowable vertical angles, where $h_l$ corresponds to the minimum y-value (e.g., vertical height) for the acceptable camera location, $h_u$ corresponds to the maximum y-value for the acceptable camera location, and $p_y$ corresponds to the y-value of the point of interest location.

$$\theta = \text{clamp}(\hat{\theta},[\theta_l,\theta_u]), \text{ where clamp}(x,[l,u]) = \max(l,\min(u,x)), \qquad \text{Equation 7}$$

Equation 7 can be utilized to calculate the nearest acceptable angle within the range from $\theta_l$ to $\theta_u$.

$$d_h = d \cdot \cos(\theta) \qquad \text{Equation 8}$$

Equation 8 can be utilized to calculate the horizontal component of the required distance from the point of interest to the camera, where f corresponds to the focal length, and w corresponds to the desired width of interest at the point of interest.

$$c = p + d_h \hat{g} + \langle 0,1,0 \rangle (d \cdot \sin(\theta)) \qquad \text{Equation 9}$$

Equation 9 can be utilized to calculate the final camera location, where c represents the camera location for capturing a photo most similar to the originally specified (e.g., specified at the inspection manager 204) desired inspection photo.

In some examples, the device-specific location translator 406 calculates device-specific location coordinates (e.g., final camera locations, as calculated in Equation 9) for any inspection locations in the inspection profile 320. In some examples, the device-specific location translator 406 communicates the device-specific location coordinates to the navigation generator 408 to generate navigation instructions to guide the user to the device-specific location coordinates to capture an inspection image. In some examples, the device-specific location translator 406 communicates the device-specific location coordinates to the location analyzer 428 to be compared with example location data 426 to determine whether a user is at an inspection location.

The navigation generator 408 of the illustrated example of FIG. 4 generates navigation instructions to guide a user of the second device 210 to an inspection location. The example navigation generator 408 of the illustrated example compares a difference between a current location represented in the location data 426 (e.g., as determined and/or communicated by the location analyzer 428) with the inspection location (e.g., the device-specific location from the device-specific location translator 406) to determine a navigation instruction from a current position of the second device 210 to the inspection location. For example, the navigation generator 408 may determine a distance and a direction vector between the current location of the user and the inspection location. In some examples, the navigation generator 408 communicates with the interface generator 438 navigation instructions to be presented on the user interface 440 (e.g., as an augmented reality overlay). For example, the navigation generator 408 may communicate with the interface generator 438 to cause an arrow overlay to be generated on the user interface 440 indicating a direction in which a user should move to reach the inspection location. In some examples, the navigation generator 408 communicates with the interface generator 438 to cause a beacon overlay to be generated on the user interface 440 indicating a location (e.g., on the ground) to which a user should move. Similarly, the navigation generator 408 can communicate with the interface generator 438 to cause a line-of-sight overlay to be generated on the user interface 440 indicating a vector between a point of interest corresponding to an inspection location and a device-specific location at which an inspection image is to be captured.

In some examples, the navigation generator 408 generates an audible instruction (e.g., via a speaker or audio output of the second device 210) to navigate a user to the inspection location. The navigation generator 408 may utilize any other alert mechanism at the second device 210 to assist a user in navigating to an inspection location.

The model manager 412 accesses and manages example vehicle models 410. In some examples, the model manager 412 accesses vehicle models from the network 208 or other cloud-based data storage location. In some examples, the vehicle models 410 are stored locally at the vehicle inspection controller 212. In some examples, the model manager 412 generates simplified versions (e.g., wireframe versions, less detailed versions, etc.) of the vehicle models 410 to be used for matching features of the simplified versions of the vehicle models 410 with vehicles present in example live camera data 416. In some examples, the vehicle models 410 are accessed already in a simplified and/or in a format that can be utilized by the image comparator 418 for vehicle and/or vehicle part recognition. In some examples, the model manager 412 communicates the vehicle models 410 and/or the simplified versions of the vehicle models 410 to the interface generator 438 to be displayed over the live camera data 416 to enable a user to identify a vehicle. In some examples, the model manager 412 communicates the vehicle models to the image comparator 418 to be compared with the live camera data 416 for vehicle identification. In some examples, in addition or alternatively to the vehicle models 410 representing whole vehicles, the vehicle models 410 may correspond to vehicle parts to enable recognition of individual vehicle parts (e.g., a tire, an engine, a fastener, etc.) to facilitate guided repair and/or replacement procedures.

The image manager 414 of the illustrated example of FIG. 4 accesses the live camera data 416 and example captured image data 422 and performs image analysis, modification, and storage. The image manager 414 includes the example image comparator 418, the example metadata manager 420, and the example image data store 424.

The image comparator 418 of the illustrated example of FIG. 4 compares the live camera data 416 with vehicle models or reference images and/or vehicle part models or reference images to perform vehicle and/or vehicle part identification. In some examples, the image comparator 418 compares the live camera data 416 with vehicle and/or vehicle part models from the model manager 412 and determines a quantity of difference between the images. In some examples, if the quantity of difference is less than a threshold (or the quantity of similarity is above a threshold), the image comparator 418 can determine the vehicle and/or vehicle part is identified. In some examples, the image comparator 418 compares the live camera data 416 with a plurality of perspectives of the vehicle and/or vehicle part model to attempt to identify the vehicle in the live camera data 416. In some examples, the image comparator 418 may include and/or communicate with a machine learning algorithm or model (e.g., a neural network) to perform image comparison and vehicle identification in the live camera data 416. In some examples, the image comparator 418 compares captured image data 422 with more than one reference image and/or model. For example, when performing an individual part inspection, the image comparator 418 may continually compare the live camera data 416 with images and/or models of the individual part as well as images and/or models of other parts (e.g., parts expected to be surrounding the individual part). Similarly, in some examples, the image comparator 418 may compare other vehicle models (e.g., other than the specific one the user is expecting to identify) with the live camera data 416 to determine whether a different vehicle may be present in the live camera data 416. In some examples, the image comparator 418 utilizes lightweight (e.g., minimally processing intensive) image fingerprinting techniques and/or comparison techniques. In some such examples, the image comparator 418 may compare the live camera data 416 with available vehicle and/or vehicle part models, thereby eliminating the need of a user to have prior knowledge of a vehicle identifier (e.g., model number) and/or vehicle part identifier.

The metadata manager 420 of the illustrated example of FIG. 4 accesses metadata corresponding to the live camera data 416. In some examples the metadata manager 420 accesses metadata from another component of the vehicle inspection controller 212 or another component of the second device 210. For example, the metadata manager 420 may access the location data 426 from the location analyzer 428 or from another component (e.g., directly from a GPS component) of the second device 210, and include location data as metadata to be stored with the captured image data 422. In some examples, the metadata manager 420 accesses annotations entered by a user before or after capturing an inspection image. In some examples, the annotations for inspection images are communicated as part of the captured image data 422. In some examples, the metadata manager 420 stores outputs of the inspection image analyzer 430 as metadata associated with an inspection image. For example, if the inspection image analyzer 430 analyzes an image and identifies a potential maintenance concern, the inspection image stored in the image data store 424 can include metadata representing the potential maintenance concern. In some examples, the metadata manager 420 stores identifying information (e.g., a name, a username, etc.) corresponding to a user who captured an inspection image when storing the inspection image.

The image data store 424 of the illustrated example of FIG. 4 accesses and stores the captured image data 422 from the camera 214. In some examples, the image data store 424 accesses metadata from the metadata manager 420 to be stored with inspection images represented in the captured image data 422. In some examples, the inspection images represented in the captured image data 422 are stored at an external location (e.g., via the cloud) or at another location accessible to the inspection manager 204 and the vehicle inspection controller 212. The image data store 424 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The image data store 424 may additionally or alternatively be implemented by one or more double data rate (DDR) memories, such as DDR, DDR2, DDR3, mobile DDR (mDDR), etc. The image data store 424 may additionally or alternatively be implemented by one or more mass storage devices such as hard disk drive(s), compact disk drive(s) digital versatile disk drive(s), etc. While in the illustrated example the image data store 424 is illustrated as a single database, the model data store 308 may be implemented by any number and/or type(s) of databases. Furthermore, the data stored in the image data store 424 may be in any data format such as, for example, binary data, comma delimited data, tab delimited data, structured query language (SQL) structures, etc.

The location analyzer 428 of the illustrated example of FIG. 4 accesses and analyzes the location data 426. In some examples, the location analyzer 428 compares a location represented in the location data 426 with device-specific location coordinates from the device-specific location translator 406 to determine whether the second device 210 is at an inspection location. In some examples, in response to the location analyzer 428 determining the second device 210 is at an inspection location, the location analyzer 428 can communicate with the interface generator 438 to cause the user interface 440 to inform a user that the second device 210 is located at the inspection location (and, therefore, an inspection photo can be captured). In some examples, the location analyzer 428 communicates with the navigation generator 408 to provide location information and/or a comparison of the location data 426 with an inspection location to facilitate generation of navigation instructions. In some examples, the location analyzer 428 communicates the location data 426 to the part information manager 436 to enable the part information manager 436 to provide location-specific information (e.g., a location of a maintenance facility, local availability of a vehicle part, etc.). In some examples, the location analyzer 428 communicates the location data 426 to the metadata manager 420 to be included as metadata associated with an inspection image.

The location analyzer 428 of the illustrated example determines whether the second device 210 is at an inspection location based on location data from the second device (e.g., from a GPS or other location sensor at the second device 210) and/or based on relative positioning data captured at the second device 210. In some examples, the location analyzer 428 coordinates with the image comparator 418, such that once the vehicle is detected, the location analyzer 428 can determine a relative positioning of the second device 210 to the vehicle and convert the location data 426 from a universal reference (e.g., universal GPS coordinates) to an object-based reference frame (e.g., coordinates and/or other location data relative to the position of the vehicle). In some examples, the location analyzer 428 determines orientation of the camera (e.g., based on gyroscopic data) to aid in determining whether the camera is appropriately directed toward the point of interest for an inspection location. In some examples, the location analyzer 428 determines whether the second device 210 and/or the camera, more specifically, is located at (1) a position on the ground relative to a vehicle corresponding to an inspection location, (2) a height corresponding to an inspection location, and/or an orientation (e.g., angular orientation of the camera) of an inspection location.

In some examples, the location analyzer 428 may utilize the location data 426, the live camera data 416, and the input commands 432 to determine the photographer location. For example, the inspection live camera data 416 may include information about the size of the vehicle part under inspection if the second device 210 is directed towards the vehicle part. The example location analyzer 428 obtains the input commands 432 from the user input accessor 434 to determine the vehicle type of the vehicle part under inspection. In this manner, the example input commands 432 are indicative that the vehicle is Tractor XYZ and the size of the vehicle part, based on the live camera data 416, is indicative that the part size of the vehicle part (e.g., a tire) is N feet. Thus, the location analyzer 428 determines that the user (e.g., photographer) is five feet away from the vehicle and approximately one foot to the right of the vehicle part. Additionally, the example location analyzer 428 utilizes image keystoning information from the inspection profile 320 to assist in determining the photographer location. As used herein, image keystoning is an effect caused by the apparent distortion of an image caused by projecting the image onto an angled surface. For example, in the typical case of a projector sitting on a table, and looking upwards to the screen, the image is larger at the top than on the bottom. In the case of a vehicle part image, image keystoning occurs when a user angles the camera (e.g., the device 210) in an angle unparallel to the vehicle 216. The image keystoning may be determined by the image comparator 418 and utilized by the location analyzer 428 to determine the photographer location.

In some examples, the photographer location is included in the inspection report generated by the inspection image analyzer 430. For example, the location analyzer 430 provides the photographer location to the inspection image analyzer 430, and thus, the inspection report includes information regarding the vehicle part along with a note about the location at which the inspection image was taken.

The example inspection image analyzer 430 of the illustrated example of FIG. 4 analyzes inspection images represented in the captured image data 422. In some examples, the inspection image analyzer 430 determines a vehicle condition, vehicle part condition, wear metric, usage metric and/or other analysis metric corresponding to a vehicle and/or vehicle part based on analysis of an inspection image. For example, the inspection image analyzer 430 can compare inspection images with reference inspection images to identify differences and make inferences about a vehicle condition, vehicle part condition, etc. For example, if an inspection image is captured corresponding to a side view of a vehicle, the inspection image analyzer 430 can compare the current inspection image with a reference image from the same perspective. In such an example, if a central portion of the vehicle has a substantially different shading or texture, the inspection image analyzer 430 may attempt to determine if the difference corresponds to damage by comparing the inspection image with reference images of known damaged vehicles.

In some examples, the inspection image analyzer 430 utilizes artificial intelligence and/or machine learning to determine vehicle and/or vehicle part conditions based on captured inspection images. For example, a neural network can be trained on inspection images from common inspection viewpoints and known vehicle and/or vehicle part conditions. In some examples, the inspection image analyzer 430 can identify missing vehicle parts based on comparing the captured inspection images with reference image data corresponding to vehicles. In some examples, the inspection image analyzer 430 communicates analysis outcomes (e.g., usage metrics, wear metrics, maintenance metrics, etc.) to the part information manager 436 to enable the part information manager 436 to retrieve maintenance information or replacement part information. For example, the part information manager 436 accesses information corresponding to a missing vehicle part. In some examples, the inspection image analyzer 430 communicates analysis outcomes to a third party (e.g., a technician, a salesperson, a rental entity, a maintenance entity, etc.) via the inspection data transmitter 444. In some examples, in response to being unable to analyze the captured inspection images, the inspection image analyzer 430 may communicate the inspection images to a third party (e.g., automatically or after receiving user approval) for further analysis. In some examples, the inspection image analyzer 430 may be able to fully diagnose a maintenance problem and facilitate correction of the problem (e.g., in coordination with the part information manager 436), providing a user with instructions to perform a maintenance operation and/or order a replacement part.

In some examples, the inspection image analyzer 430 compares current inspection images with prior inspection images to determine changes in a vehicle condition or vehicle part condition. For example, if a vehicle is being rented, inspection images can be taken at the time of initiation of the rental to determine a condition of the vehicle, and inspection images can be taken again when the vehicle is returned to determine if the condition of the vehicle has changed. For example, the inspection image analyzer 430 can compare current inspection images with prior inspection images to determine whether visual defects (e.g., scratches, dents, etc.) have occurred during the rental period, whether any parts are missing, whether parts are damaged, etc. In some examples, the inspection image analyzer 430 can generate predictive analytics based on analyses of past inspection images. For example, based on past inspection images of a same type of vehicle, the inspection image analyzer 430 may predict an amount of time for a quantified measure of wear to occur (e.g., after three months of normal use, tire tread thickness may be expected to decrease 1-2 mm).

The inspection image analyzer 430 of the illustrated example can calculate measurements based on inspection images. For example, with knowledge of a location at which an inspection image was captured, relative to the vehicle, dimensions of vehicle parts can be measured. In some examples, a user may utilize adjustable overlays on the user interface 440 to help the inspection image analyzer 430 conduct a part analysis. For example, when analyzing a tire, the interface generator 438 can overlay a circular/elliptical shape that the user can adjust to match the tire in the captured image data 422. The inspection image analyzer 430 can calculate an overall dimensions, a tread depth, a thickness, or other metric of the tire based on the corresponding dimension of the adjusted overlay in the reference frame of the captured image data 422 (e.g., if the circular overlay has a two inch diameter on the screen, and each inch on the screen corresponds to two feet on the vehicle at the current location relative to the vehicle, the tire can be calculated to be four feet in diameter).

The user input accessor 434 of the illustrated example of FIG. 4 accesses and acts upon the input commands 432. For example, the input commands 432 may correspond to selections on the user interface 440 (e.g., a user selecting to initiate an inspection, capture an image, transmit inspection data, etc.). The user input accessor 434 communicates input commands to the appropriate component of the vehicle inspection controller 212 or component of the second device 210 to execute the requested function. For example, if one of the input commands 432 requests an inspection image be captured, the user input accessor 434 can communicate to the camera 214 to cause an image to be captured. As another example, if one of the input commands 432 requests an inspection be initiated for a specific type of vehicle, the user input accessor 434 can communicate with the inspection profile accessor 404 to retrieve the inspection profile 320 corresponding to the vehicle type indicated. In some examples, the user input accessor 434 communicates with the interface generator 438 to cause a change of the user interface 440 based on one of the input commands 432 (e.g., requesting a menu, toggling a switch on the user interface 440, etc.).

The part information manager 436 of the illustrated example of FIG. 4 accesses part information corresponding to a vehicle part. In some examples, the part information manager 436 accesses information from a network resource (e.g., via the Internet). In some examples, the part information manager 436 accesses information for a vehicle part stored locally. In some examples, the part information manager 436 accesses maintenance information to instruct a user to perform a maintenance procedure. In some such examples, after retrieving the maintenance procedure instructions, the part information manager 436 communicates with the interface generator 438 to cause maintenance instructions to appear on the user interface 440. In some examples, the part information manager 436 accesses part ordering information. For example, the part information manager 436 may navigate (e.g., via an Internet browser) to an ordering form to place an order for a replacement part. In some examples, the part information manager 436 retrieves a user manual or other resource a user can utilize to learn about a vehicle or vehicle part.

The example interface generator 438 of the illustrated example of FIG. 4 generates the user interface 440. In some examples, the interface generator 438 communicates the user interface 440 to a display of the second device 210. The interface generator 438 of the illustrated example accesses information from the components of the vehicle inspection controller 212 to generate the user interface 440. For example, the model manager 412 can communicate an outline of a vehicle model to be displayed over the live camera data 416 on the user interface 440. The interface generator 438 of the illustrated example communicates with the camera 214 to display the live camera data 416 in conjunction with augmented reality overlays and/or other features to enable augmented reality vehicle inspection.

The example inspection data store 442 of the illustrated example of FIG. 4 stores inspection data. For example, the inspection data store 442 can store the captured image data 422, metadata corresponding to captured inspection images, analyses from the inspection image analyzer 430, information from the part information manager 436, and/or any other information corresponding to an inspection. The inspection data store 442 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The inspection data store 442 may additionally or alternatively be implemented by one or more double data rate (DDR) memories, such as DDR, DDR2, DDR3, mobile DDR (mDDR), etc. The inspection data store 442 may additionally or alternatively be implemented by one or more mass storage devices such as hard disk drive(s), compact disk drive(s) digital versatile disk drive(s), etc. While in the illustrated example the inspection data store 442 is illustrated as a single database, the inspection data store 442 may be implemented by any number and/or type(s) of databases. Furthermore, the data stored in inspection data store 442 may be in any data format such as, for example, binary data, comma delimited data, tab delimited data, structured query language (SQL) structures, etc.

The example inspection data transmitter 444 of the illustrated example of FIG. 4 communicates example inspection data 446 to a third party and/or other device. In some examples, the inspection data transmitter 444 transmits the inspection data 446 to a third party in response to a user requesting to send the inspection data 446 to a third party (e.g., via one of the input commands 432). In some examples, the inspection data transmitter 444 communicates inspection data collected to a third party as it is collected. In some examples, the inspection data transmitter 444 communicates the inspection data 446 to a third party in response to an indication from the inspection image analyzer 430 (e.g., if an issue requiring an inspector's analysis is identified). In some examples, the inspection data transmitter 444 periodically transmits any new (e.g., not yet transmitted) inspection data in the inspection data store 442.

While an example manner of implementing the vehicle inspection controller 212 of FIG. 2 is illustrated in FIG. 4, one or more of the elements, processes and/or devices illustrated in FIG. 4 may be combined, divided, re-arranged, omitted, eliminated and/or implemented in any other way. Further, the example inspection profile manager 402, the example inspection profile accessor 404, the example device-specific location translator 406, the example navigation generator 408, the example model manager 412, the example image manager 414, the example image comparator 418, the example metadata manager 420, the example image data store 424, the example location analyzer 428, the example inspection image analyzer 430, the example user input accessor 434, the example part information manager 436, the example interface generator 438, the example inspection data store 442, the example inspection data transmitter 444 and/or, more generally, the example vehicle inspection controller 212 of FIG. 4 may be implemented by hardware, software, firmware and/or any combination of hardware, software and/or firmware. Thus, for example, any of the example inspection profile manager 402, the example inspection profile accessor 404, the example device-specific location translator 406, the example navigation generator 408, the example model manager 412, the example image manager 414, the example image comparator 418, the example metadata manager 420, the example image data store 424, the example location analyzer 428, the example inspection image analyzer 430, the example user input accessor 434, the example part information manager 436, the example interface generator 438, the example inspection data store 442, the example inspection data transmitter 444 and/or, more generally, the example vehicle inspection controller 212 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example inspection profile manager 402, the example inspection profile accessor 404, the example device-specific location translator 406, the example navigation generator 408, the example model manager 412, the example image manager 414, the example image comparator 418, the example metadata manager 420, the example image data store 424, the example location analyzer 428, the example inspection image analyzer 430, the example user input accessor 434, the example part information manager 436, the example interface generator 438, the example inspection data store 442 and/or the example inspection data transmitter 444 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle inspection controller 212 of FIG. 2 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
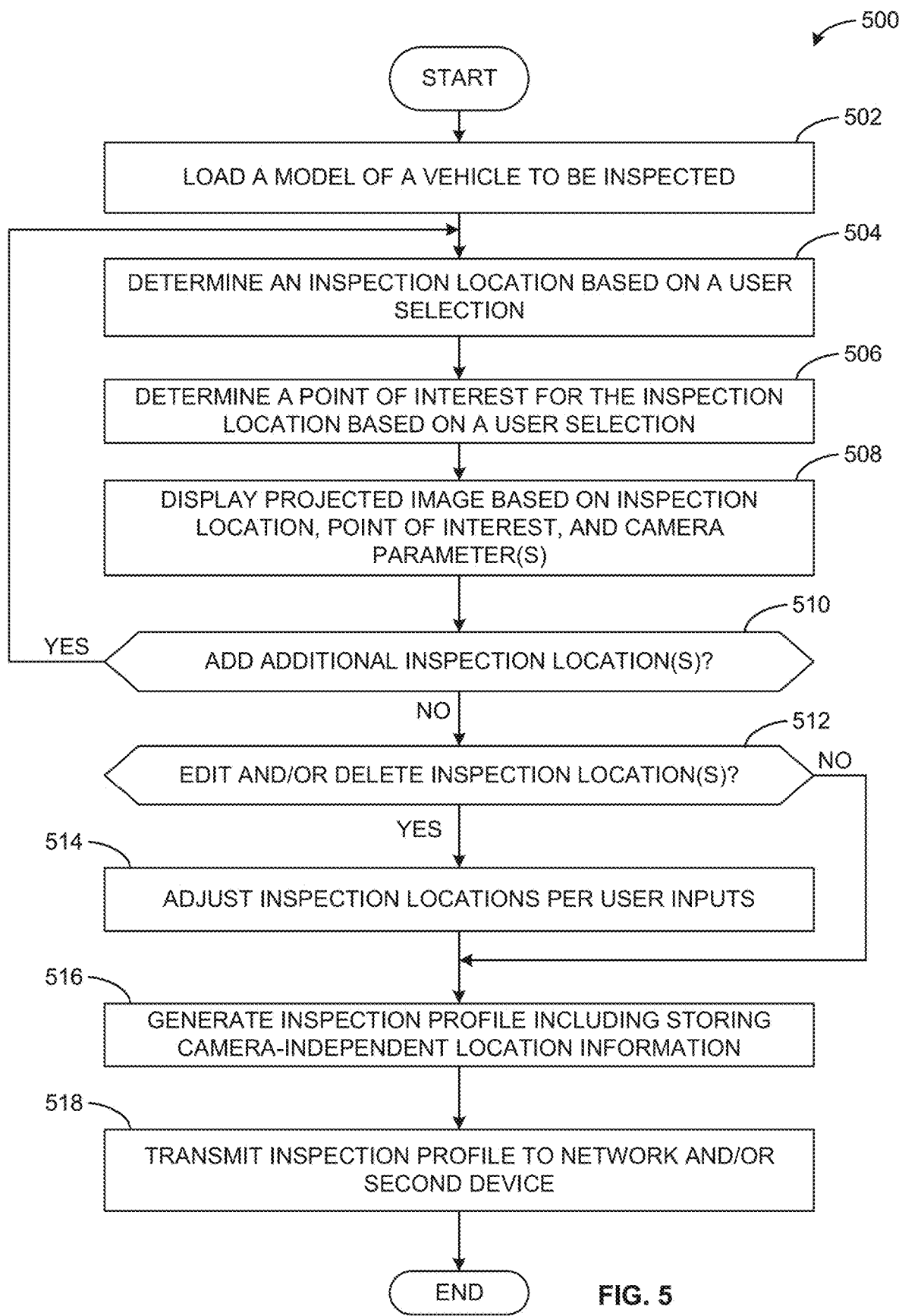
FIG. 5 is a flowchart representative of example machine readable instructions that may be executed to implement the inspection manager of FIG. 3 to generate an inspection profile.

A flowchart representative of example hardware logic, machine readable instructions, hardware implemented state machines, and/or any combination thereof for implementing the inspection manager 204 of FIG. 3 is shown in FIG. 5. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 5, many other methods of implementing the example inspection manager 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example machine readable instructions 500 that may be executed by the inspection manager 204 of FIGS. 2 and 3 to generate an inspection profile are illustrated in FIG. 5. With reference to the preceding figures and associated descriptions, the example machine readable instructions 500 of FIG. 5 begin with the example inspection manager 204 loading a model of a vehicle to be inspected (Block 502). In some examples, the model accessor 306 loads a model of a vehicle to be inspected.

At block 504, the example inspection manager 204 determines an inspection location based on a user selection. In some examples, the inspection location manager 312 and/or the camera-independent location generator 314 determines an inspection location based on the input commands 302 accessed at the user input receiver 304.

At block 506, the example inspection manager 204 determines a point of interest for the inspection location based on a user selection. In some examples, the inspection location manager 312 and/or the camera-independent location generator 314 determines a point of interest for the inspection location based on the input commands 302 accessed at the user input receiver 304.

At block 508, the example inspection manager 204 displays a projected image based on the inspection location, the point of interest, and one or more camera parameter(s). In some examples, the projected camera view generator 322 displays a projected image based on the inspection location, the point of interest, and one or more camera parameter(s).

At block 510, the example inspection manager 204 determines whether there are any additional inspection location(s) to be entered in the inspection profile. In some examples, the inspection location manager 312 determines whether there are any additional inspection location(s) to be entered in the inspection profile based on the input commands 302 accessed at the user input receiver 304. In response to there being additional inspection location(s) to be entered in the inspection profile, processing transfers to block 504. Conversely, in response to there not being additional inspection location(s) to add, processing transfers to block 512.

At block 512, the example inspection manager 204 determines whether to edit and/or delete inspection location(s). In some examples, the user input receiver 304 determines whether the inspection profile generator 310 should edit and/or delete inspection location(s) based on the input commands 302. In response to editing and/or deleting one or more inspection location(s), processing transfers to block 514. Conversely, in response to not editing and/or deleting inspection location(s), processing transfers to block 516.

At block 514, the example inspection manager 204 adjusts inspection locations per user inputs. In some examples, the inspection profile generator 310 adjusts inspection locations per user inputs. In some examples, the inspection location manager 312 and/or the camera-independent location generator 314 adjusts inspection locations per the input commands 302.

At block 516, the example inspection manager 204 generates an inspection profile including storing camera-independent location information. In some examples, the inspection profile generator 310 generates the inspection profile including storing camera-independent location information. In some examples, the camera-independent location generator 314 generates camera-independent location coordinates (e.g., a point of interest, a direction vector, a width of interest, etc.). In some examples, the inspection profile is stored in the inspection profile data store 316 and/or another location accessible by the inspection manager 204.

At block 518, the example inspection manager 204 transmits the inspection profile to the network and/or the second device. In some examples, the inspection profile transmitter 318 transmits the inspection profile to a storage location on the network 208 (e.g., a cloud storage location) and/or to the second device 210.

Flowcharts representative of example hardware logic, machine readable instructions, hardware implemented state machines, and/or any combination thereof for implementing the vehicle inspection controller 212 of FIGS. 2 and 4 are shown in FIGS. 6A, 6B, 7, and 8. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 6A, 6B, 7, and 8, many other methods of implementing the example vehicle inspection controller 212 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6A, 6B, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 6A:
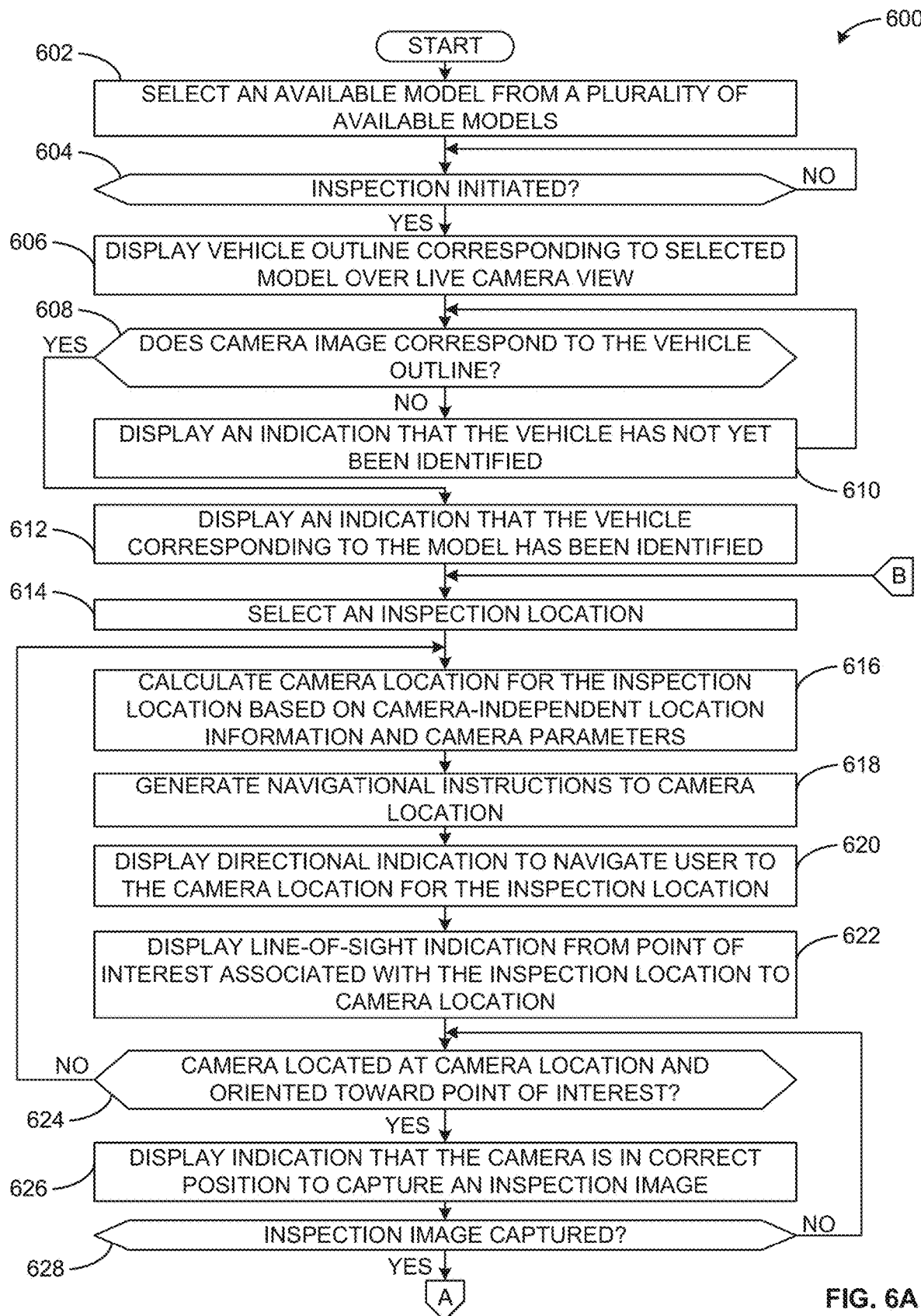
FIGS. 6A-6B are a flowchart representative of example machine readable instructions that may be executed to implement the vehicle inspection controller of FIG. 4 to perform a vehicle inspection.
Figure 6B:
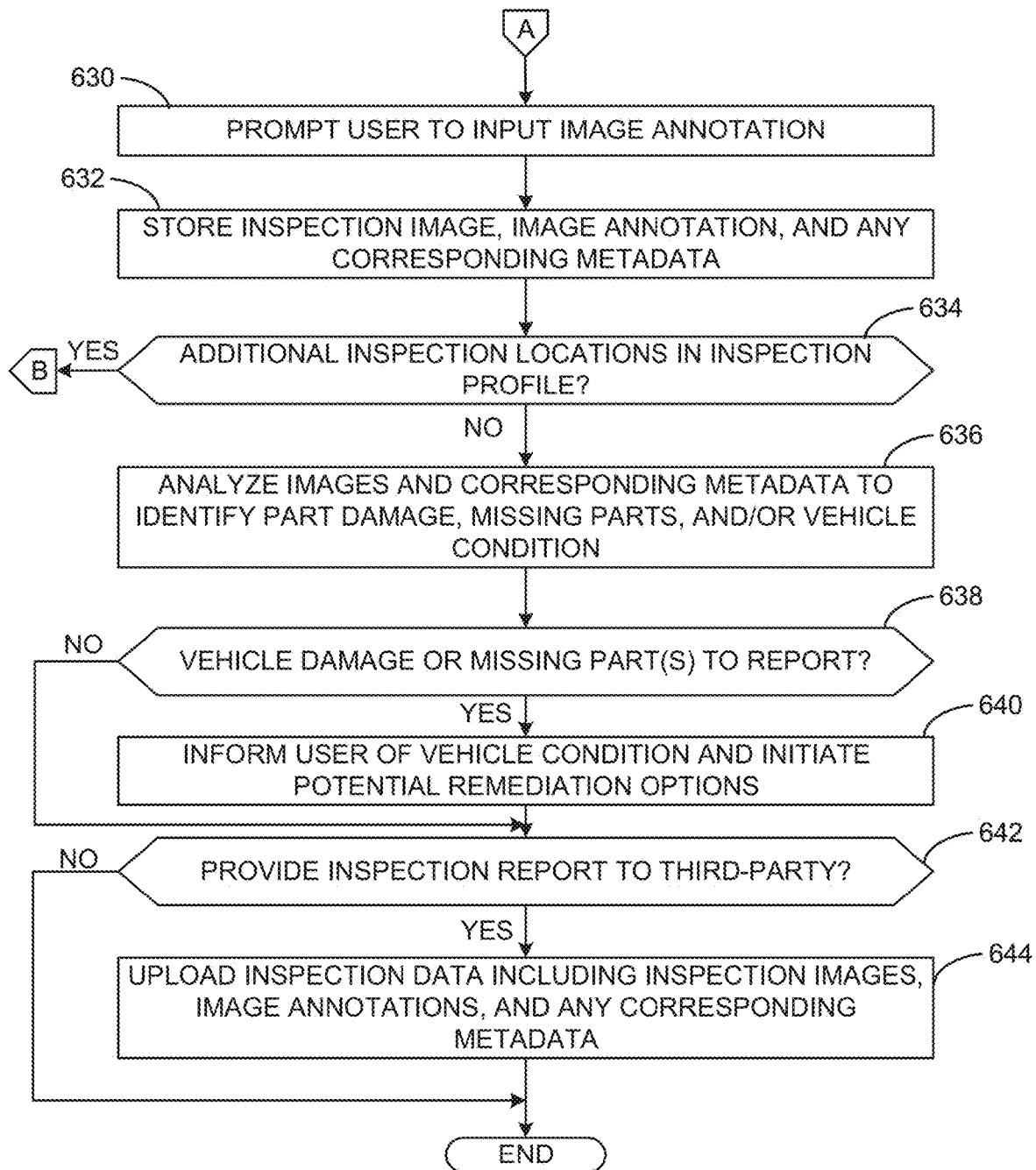

Example machine readable instructions 600 that may be executed by the vehicle inspection controller 212 of FIG. 4 to perform a vehicle inspection are illustrated in FIGS. 6A-6B. With reference to the preceding figures and associated descriptions, the example machine readable instructions 600 of FIG. 6 begin with the example vehicle inspection controller 212 selecting an available model form a plurality of available models (Block 602). In some examples, the model manager 412 selects an available model from the vehicle models 410. In some examples, the model manager 412 selects an available model based on one or more of the input commands 432.

At block 604, the example vehicle inspection controller 212 determines whether an inspection has been initiated. In some examples, the user input accessor 434 determines whether an inspection has been initiated based on one or more of the input commands 432. In response to an inspection being initiated, processing transfers to block 606. Conversely, in response to an inspection not being initiated, processing remains at block 604.

At block 606, the example vehicle inspection controller 212 displays a vehicle outline corresponding to the selected model over a live camera view. In some examples, the model manager 412 communicates a vehicle outline representation based on the vehicle models 410 to the interface generator 438 to display the vehicle outline corresponding to the selected model over the live camera view.

At block 608, the example vehicle inspection controller 212 determines if the camera image corresponds to the vehicle outline. In some examples, the image comparator 418 compares the live camera data 416 with a vehicle outline corresponding to one or more of the vehicle models 410 accessed by the model manager 412. In response to the camera image corresponding to the vehicle outline, processing transfers to block 612. Conversely, in response to the camera image not corresponding to the vehicle outline, processing transfers to block 610.

At block 610, the example vehicle inspection controller 212 displays an indication that the vehicle has not yet been identified. In some examples, the image comparator 418 determines that the vehicle has not been identified, and the interface generator 438 generates an indication that the vehicle has not yet been identified.

At block 612, the example vehicle inspection controller 212 displays an indication that the vehicle corresponding to the model has been identified. In some examples, the interface generator 438 displays an indication that the vehicle corresponding to the model has been identified.

At block 614, the example vehicle inspection controller 212 selects an inspection location. In some examples, the inspection profile accessor 404 selects an inspection location in the inspection profile 320. In some examples, the inspection profile accessor 404 selects an inspection location in the inspection profile 320 in response to one of the input commands 432.

At block 616, the example vehicle inspection controller 212 calculates a camera location for the inspection location based on camera-independent location information and camera parameters. In some examples, the device-specific location translator 406 calculates a camera location for the inspection location based on camera-independent location information included in the inspection profile 320, camera characteristics (e.g., a focal length or angular field of view), and/or other parameters (e.g., a maximum height for a photograph to be taken, a minimum height for a photograph to be taken, etc.).

At block 618, the example vehicle inspection controller 212 generates navigational instructions to the camera location. In some examples, the navigation generator 408 generates navigational instructions by comparing the location data 426 accessed at the location analyzer 428 with the camera location for an inspection location and determining a route from the current location represented in the location data 426 to the inspection location.

At block 620, the example vehicle inspection controller 212 displays a directional indication to navigate a user to the camera location for the inspection location. In some examples, the navigation generator 408 communicates a navigation instruction to the interface generator 438 and the interface generator 438 displays the directional indication corresponding to the navigation instruction.

At block 622, the example vehicle inspection controller 212 displays a line-of-sight indication from a point of interest associated with the inspection location to the camera location. In some examples, the interface generator 438 displays a line-of-sight indication from the point of interest, represented in the inspection profile 320 to the camera location determined by the device-specific location translator 406.

At block 624, the example vehicle inspection controller 212 determines if the camera is located at the camera location and oriented toward the point of interest. In some examples, the location analyzer 428 determines if the camera is at the camera location corresponding to the inspection location and is oriented toward the point of interest. In some examples, the image comparator 418 may be utilized to determine whether the camera is oriented toward the point of interest. In response to the camera being located at the camera location and being oriented toward the point of interest, processing transfers to block 626. Conversely, in response to the camera not being located at the camera location and/or oriented toward the point of interest, processing transfers to block 616.

At block 626, the example vehicle inspection controller 212 displays an indication that the camera is in the correct position to capture an inspection image. In some examples, the interface generator 438 displays an indication on the user interface 440 that the camera is in the correct position to capture an inspection image. In some examples, the camera may automatically capture an inspection image when it is determined that the camera is in at the inspection location and is oriented toward the point of interest.

At block 628, the example vehicle inspection controller 212 determines if an inspection image has been captured. In some examples, the image manager 414 determines if the inspection image has been captured based on whether the captured image data 422 has been received. In some examples, the image data store 424 and/or the inspection image analyzer 430 determines if the inspection image has been captured. In response to an inspection image being captured, processing transfers to block 630 of FIG. 6B. Conversely, in response to an inspection image not being captured, processing transfers to block 624.

The example machine readable instructions 600 continue in FIG. 6B with the example vehicle inspection controller 212 prompting a user to input an image annotation (Block 630). In some examples, the metadata manager 420 causes the interface generator 438 to prompt a user to input an image annotation via the user interface 440.

At block 632, the example vehicle inspection controller 212 stores the inspection image, an image annotation and any corresponding metadata. In some examples, the image data store 424 stores the inspection image, the image annotation, and any corresponding metadata (e.g., a location at which the image was taken, an analysis result of the inspection image from the inspection image analyzer 430, etc.).

At block 634, the example vehicle inspection controller 212 determines whether there are additional inspection locations in the inspection profile. In some examples, the inspection profile accessor 404 determines whether there are additional inspection locations in the inspection profile. In some examples, in response to there being additional inspection locations in the inspection profile, processing returns to block 614 of FIG. 6A. Conversely, in response to there no being additional inspection locations in the inspection profile, processing transfers to block 636.

At block 636, the example vehicle inspection controller 212 analyzes inspection images and corresponding metadata to identify part damage, missing parts, and/or a vehicle condition. In some examples, the inspection image analyzer 430 analyzes inspection images and corresponding metadata to identify part damage, missing parts, and/or a vehicle and/or vehicle part condition.

At block 638, the example vehicle inspection controller 212 determines whether there is vehicle damage or missing part(s) to report. In some examples, the inspection image analyzer 430 determines whether there is vehicle damage or missing part(s) to report. In response to there being vehicle damage and/or missing part(s) to report, processing transfers to block 640. Conversely, in response to there not being vehicle damage and/or missing part(s) to report, processing transfers to block 642.

At block 640, the example vehicle inspection controller 212 informs the user of a vehicle condition and initiates potential remediation options. In some examples, the interface generator 438 informs the user of the vehicle condition and initiates potential remediation options. For example, the interface generator 438 generates a maintenance alert in response to receiving the vehicle condition. In some examples, the part information manager 436 accesses part information (e.g., maintenance information, part ordering information, etc.) and communicates with the interface generator 438 to provide the user with potential remediation options for the detected vehicle damage and/or missing part(s). For example, the interface generator 438 displays part ordering information in response to the vehicle condition.

At block 642, the example vehicle inspection controller 212 determines whether to provide the inspection report to a third-party. In some examples, the user input accessor 434 determines based on the input commands 432 whether to provide the inspection report to a third-party. In some examples, the inspection image analyzer 430 determines, based on a setting, whether to provide the inspection report to a third-party. In some examples, the inspection image analyzer 430 determines based on a severity of any vehicle damage and/or missing part(s) whether to provide the inspection report to a third-party. In response to determining to provide the inspection report to a third-party, processing transfers to block 644. Conversely, in response to determining not to provide the inspection report to a third-party, processing terminates.

At block 644, the example vehicle inspection controller 212 uploads inspection data including inspection images, image annotations, and any corresponding metadata. In some examples, the inspection data transmitter 444 uploads the inspection data 446 to a storage location accessible via the network 208.

Figure 7:
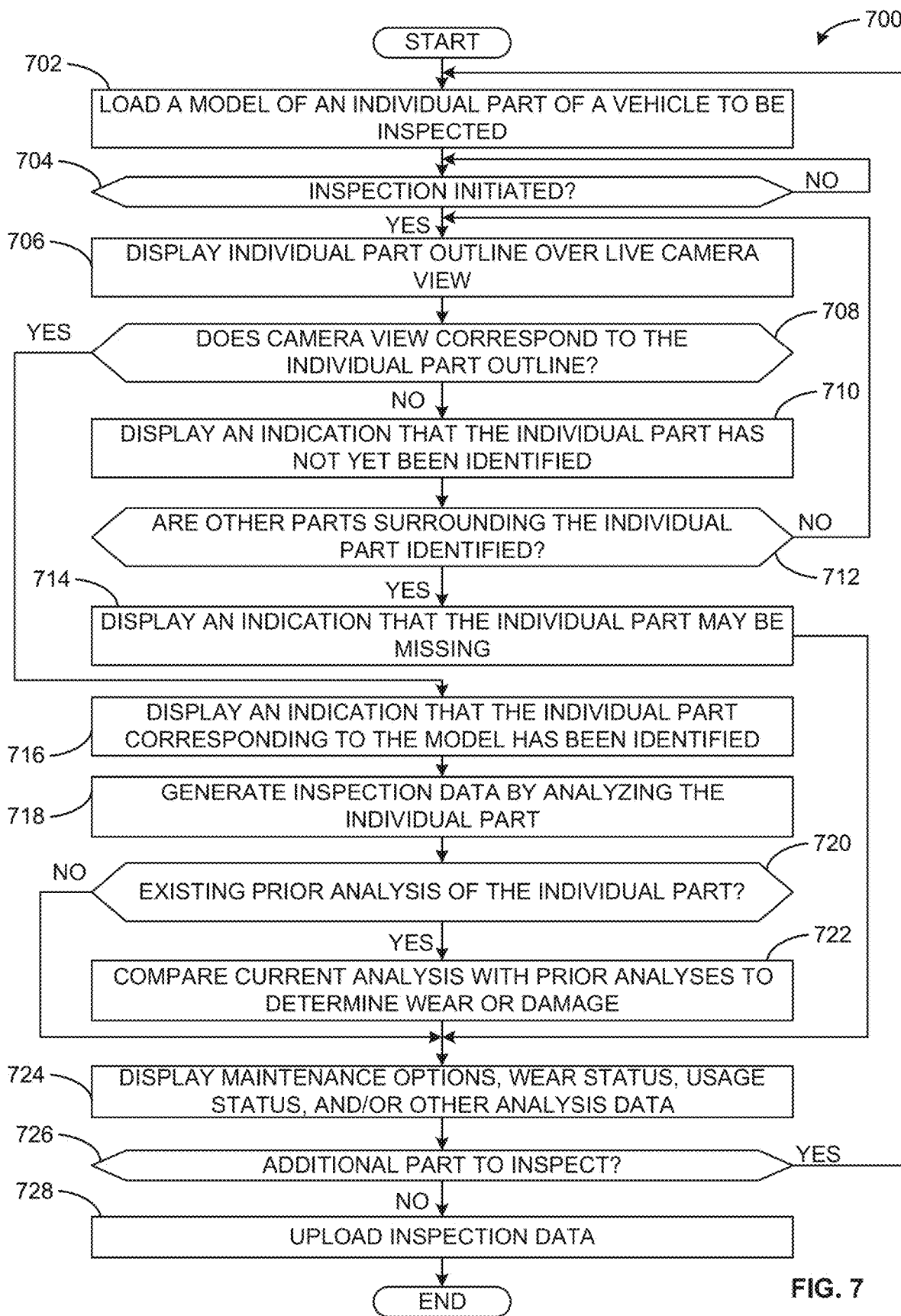
FIG. 7 is a flowchart representative of example machine readable instructions that may be executed to implement the vehicle inspection controller of FIG. 4 to perform a vehicle part inspection.

Example machine readable instructions 700 that may be executed by the vehicle inspection controller 212 to perform a vehicle part inspection are illustrated in FIG. 7. The machine readable instructions 700 begin with the example vehicle inspection controller 212 loading a model of an individual part of a vehicle to be inspected (Block 702). In some examples, the model manager 412 loads a vehicle part model for a vehicle part to be inspected.

At block 704, the example vehicle inspection controller 212 determines if an inspection has been initiated. In some examples, the user input accessor 434 determines if an inspection has been initiated. In response to an inspection being initiated, processing transfers to block 706. Conversely, in response to an inspection not being initiated, processing remains at block 704.

At block 706, the example vehicle inspection controller 212 displays an individual part outline over a live camera view. In some examples, the interface generator 438 causes the user interface 440 to display an individual part outline based on the vehicle part model accessed by the model manager 412 over a live camera view.

At block 708, the example vehicle inspection controller 212 determines if the camera view corresponds to the individual part outline. In some examples, the image comparator 418 determines if the live camera data 416 corresponds to the individual part outline. In response to the camera view corresponding to the individual part outline, processing transfers to block 716. Conversely, in response to the camera view not corresponding to the individual part outline, processing transfers to block 710.

At block 710, the example vehicle inspection controller 212 displays an indication that the individual part has not yet been identified. In some examples, the interface generator 438 displays an indication that the vehicle part has not yet been identified on the user interface 440.

At block 712, the example vehicle inspection controller 212 determines if other parts surrounding the individual part have been identified. In some examples, the image comparator 418 determines if other parts surrounding the individual part have been identified in the live camera data 416. In response to other parts surrounding the individual part being identified, processing transfers to block 714. Conversely, in response to other parts surrounding the individual part being identified, processing transfers to block 706.

At block 714, the example vehicle inspection controller 212 displays an indication that the individual part may be missing. In some examples, the interface generator 438 displays an indication that the individual part may be missing.

At block 716, the example vehicle inspection controller 212 displays an indication that the individual part corresponding to the model has been identified. In some examples, the interface generator 438 displays an indication that the individual part corresponding to the model has been identified.

At block 718, the example vehicle inspection controller 212 generates inspection data by analyzing the individual part. In some examples, the inspection image analyzer 430 generates inspection data by analyzing the individual part.

At block 720, the example vehicle inspection controller 212 determines if there is prior inspection data for the individual part. In some examples, the inspection image analyzer 430 determines if there is existing analysis data corresponding to the vehicle part in the inspection data store 442. For example, if a vehicle was inspected when it was originally rented, there may be initial inspection data that can be utilized for comparison. In response to there being existing prior analysis of the individual part, processing transfers to block 722. Conversely, in response to there not being existing prior analysis of the individual part, processing transfers to block 724.

At block 722, the example vehicle inspection controller 212 compares a current analysis with one or more prior analyses (e.g., prior measurements, prior inspection data, etc.) to determine wear or damage. In some examples, the inspection image analyzer 430 compares a current analysis with one or more prior analyses. In some examples, the inspection image analyzer 430 determines a metric corresponding to the updated state of the vehicle and/or vehicle part (e.g., a usage metric, a wear metric, etc.) relative to the initial metric At block 724, the example vehicle inspection controller 212 displays maintenance options, a wear status, usage status and/or other analysis data. In some examples, the interface generator 438 displays maintenance options, a wear status, usage status and/or other analysis data on the user interface 440.

At block 726, the example vehicle inspection controller 212 determines whether there is an additional vehicle part to inspect. In some examples, the user input accessor 434 determines whether there is an additional part to inspect based on the input commands 432. In response to there being an additional part to inspect, processing transfers to block 702. In some examples, in response to there not being an additional part to inspect, processing transfers to block 728.

At block 728, the example vehicle inspection controller 212 uploads inspection data. In some examples, the inspection data transmitter 444 uploads the inspection data to the network 208 to be accessible to a third-party and/or the inspection manager 204.

Figure 8:
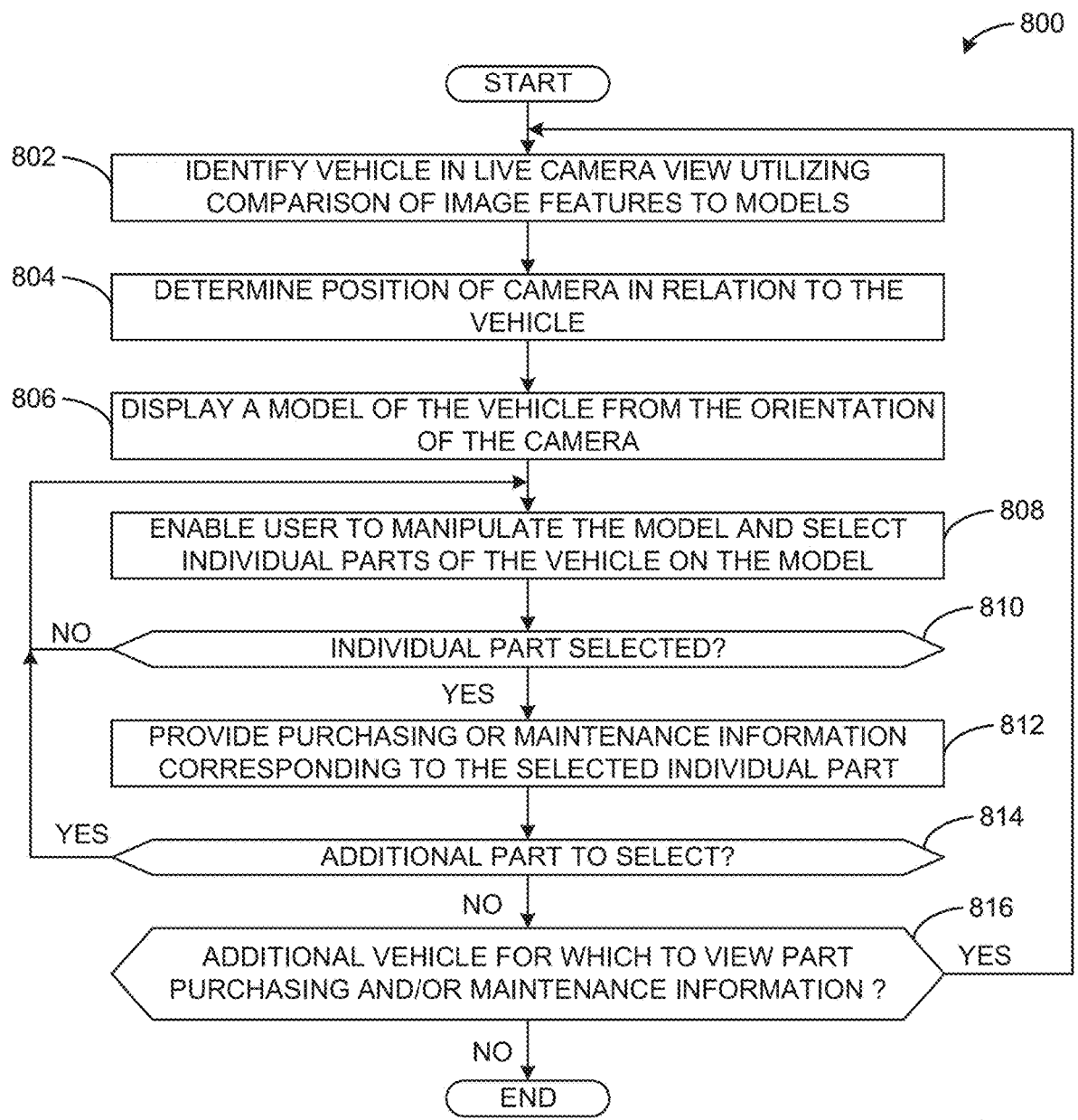
FIG. 8 is a flowchart representative of example machine readable instructions that may be executed to implement the vehicle inspection controller of FIG. 4 to obtain vehicle part purchasing and/or maintenance information.

Example machine readable instructions 800 that may be executed to implement the vehicle inspection controller 212 to obtain vehicle part purchasing and/or maintenance information are illustrated in FIG. 8. With reference to the preceding figures and associated description, the machine readable instructions 800 begin with the example vehicle inspection controller 212 identifying a vehicle in a live camera view utilizing comparison of image features to models (block 802). In some examples, the image comparator 418 identifies the vehicle by comparing the live camera data 416 to one or more of the vehicle models 410.

At block 804, the example vehicle inspection controller 212 determines a position of the camera in relation to the vehicle. In some examples, the location analyzer 428 determines a position of the camera (e.g., a position of the second device 210) in relation to the vehicle.

At block 806, the example vehicle inspection controller 212 displays a model of the vehicle from the orientation of the camera. In some examples, the interface generator 438 displays a model of the vehicle from the orientation of the camera.

At block 808, the example vehicle inspection controller 212 enables a user to manipulate the model and select individual parts of the vehicle in the model. In some examples, the interface generator 438 enables a user to manipulate the model and select individual parts of the vehicle on the model.

At block 810, the example vehicle inspection controller 212 determines if an individual part has been selected. In some examples, the user input accessor 434 determines, based on the input commands 432, if an individual part has been selected. In response to an individual part being selected, processing transfers to block 812. Conversely, in response to an individual part not being selected, processing transfers to block 808.

At block 812, the example vehicle inspection controller 212 provides purchasing or maintenance information corresponding to the selected individual part. In some examples, the part information manager 436 provides purchasing or maintenance information corresponding to the selected individual part.

At block 814, the example vehicle inspection controller 212 determines if there is an additional part to select. In some examples, the user input accessor 434 determines, based on the input commands 432, whether there is an additional part to select. In response to there being an additional part to select, processing transfers to block 808. Conversely, in response to there not being an additional part to select, processing transfers to block 816.

At block 816, the example vehicle inspection controller 212 determines if there is an additional vehicle for which to view part purchasing and/or maintenance information. In some examples, the user input accessor 434 determines, based on the input commands 432, if there is an additional vehicle for which to view part purchasing and/or maintenance information. In response to there being an additional vehicle for which to view part purchasing and/or maintenance information, processing transfers to block 802. Conversely, in response to there not being an additional vehicle for which to view part purchasing and/or maintenance information, processing terminates.

Figure 9A:
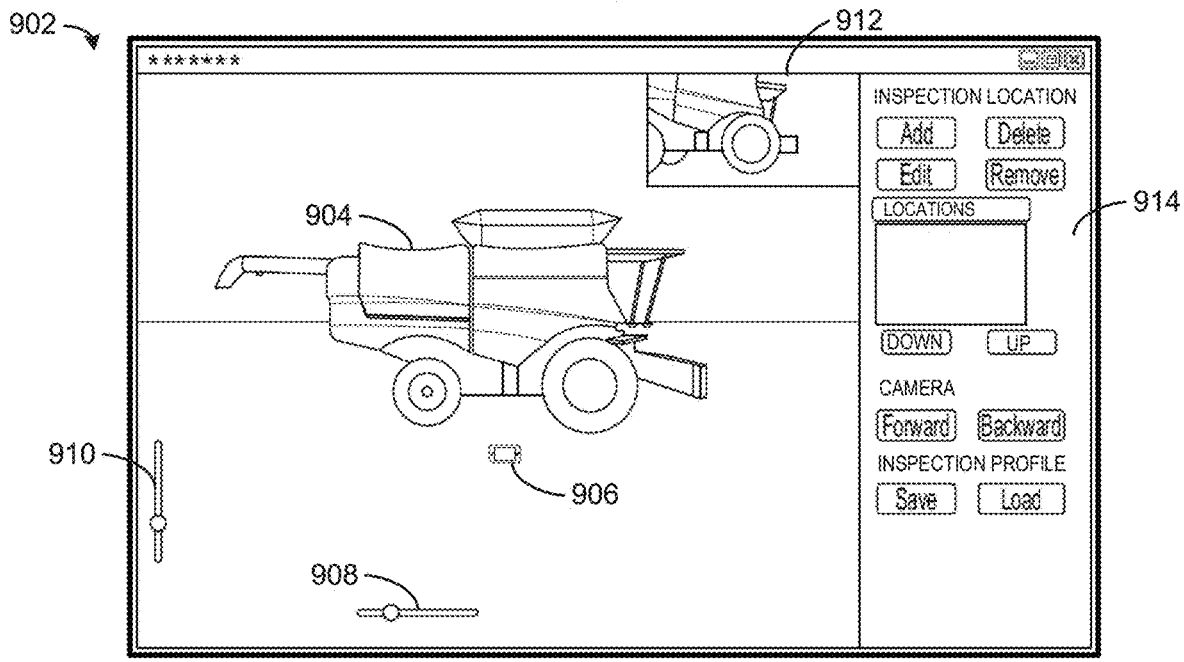
FIG. 9A is a first screenshot of an example first interface generated by the example inspection manager of FIG. 3 to generate an inspection profile for an example vehicle model.

FIG. 9A is a first screenshot of an example first interface 902 generated by the example inspection manager 204 of FIG. 3 to generate an inspection profile for an example vehicle model 904.

The first interface 902 includes an example mobile device symbol 906 illustrating a current inspection location. A user can adjust the position of the mobile device symbol 906 to change a position for an inspection location. For example, the user can utilize an example horizontal slider 908 and/or an example vertical slider 910 to adjust a position of the mobile device symbol 906 on the first interface 902. In some examples, the first interface 902 includes a height slider to adjust a height of the mobile device symbol 906 from the ground, and/or a rotational adjuster to adjust a rotation of the mobile device symbol 906 relative to the vehicle model 904.

The first interface 902 includes an example projected image 912 generated by the projected camera view generator 322 of the inspection manager 204 of FIG. 3. The projected image 912 illustrates a projection of the inspection image that would result from taking an inspection image at the current location and orientation of the mobile device symbol 906.

The first interface 902 includes an example adjustment menu 914 including options to add, delete, edit, and/or remove inspection locations from an inspection profile. The adjustment menu 914 includes a listing of location views that are currently stored in an inspection profile (e.g., below "locations") which is currently empty, as no inspection locations have been stored at the time of the first screenshot of the first interface 902. The adjustment menu 914 includes a camera adjustment to adjusts a position of the mobile device symbol 906 relative to the vehicle model 904 (e.g., "forward" moves toward the vehicle model 904, "backward" moves away from the vehicle model 904, etc.). The adjustment menu 914 of the illustrated example includes buttons to save or load inspection profiles. In some examples, the inspection profiles can be saved or loaded to a network storage location to be accessible at the vehicle inspection controller 212.

Figure 9B:
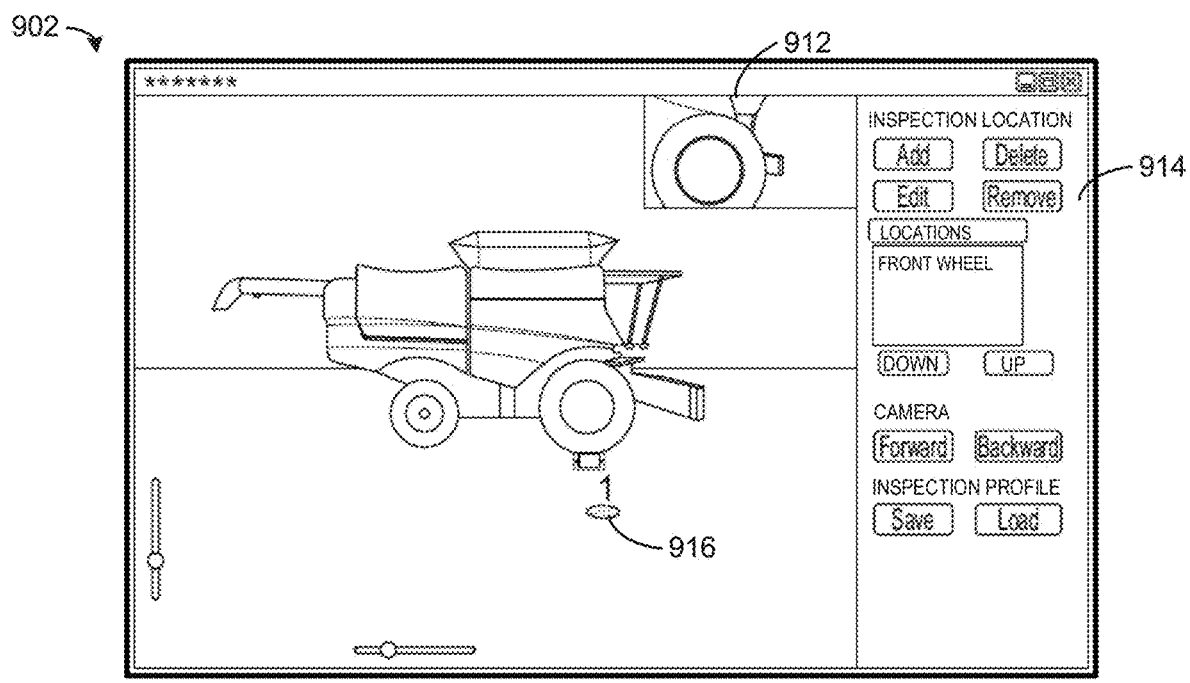
FIG. 9B is a second screenshot of the first interface of FIG. 9A, including an example first inspection location.

FIG. 9B is a second screenshot of the first interface 902 of FIG. 9A, including an example first inspection location 916. Once a user is satisfied with the projected image 912 at a selected inspection location, the inspection can be stored. For example, the user can select the "add" button on the adjustment menu 914 to store the first inspection location 916 to the inspection profile. In some examples, the user can enter a label for the inspection location. For example, in the illustrated screenshot of FIG. 9B, the inspection location has been labeled "FRONT WHEEL."

Figure 9C:
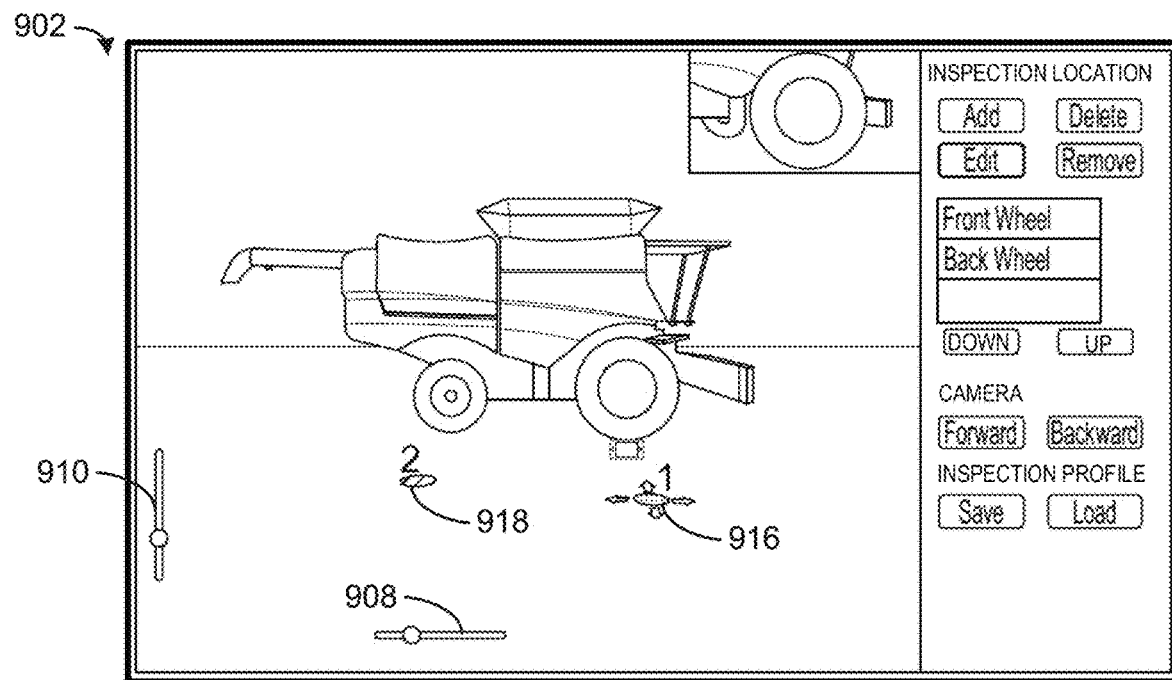
FIG. 9C is a third screenshot of the first interface of FIGS. 9A-9B, including an example second inspection location.

FIG. 9C is a third screenshot of the first interface 902 of FIGS. 9A-9B, including an example second inspection location 918. In the illustrated example of FIG. 9C, the first inspection location 916 is selected, and is in an edit mode (e.g., as indicated by the arrows extending from the first inspection location 916). In some examples, a user can directly select (e.g., click on) the first inspection point and move a cursor or other indicator to move the first inspection location 916. In some examples, a user can click the arrows extending from the first inspection location 916 to adjust the first inspection location 916. In some examples, a user can utilize the horizontal slider 908 or the vertical slider 910 to adjust the first inspection location 916. In the illustrated example of FIG. 9C, the first inspection location 916 has been labeled "Front Wheel" and the second inspection location 918 has been labeled "Back Wheel."

Figure 9D:
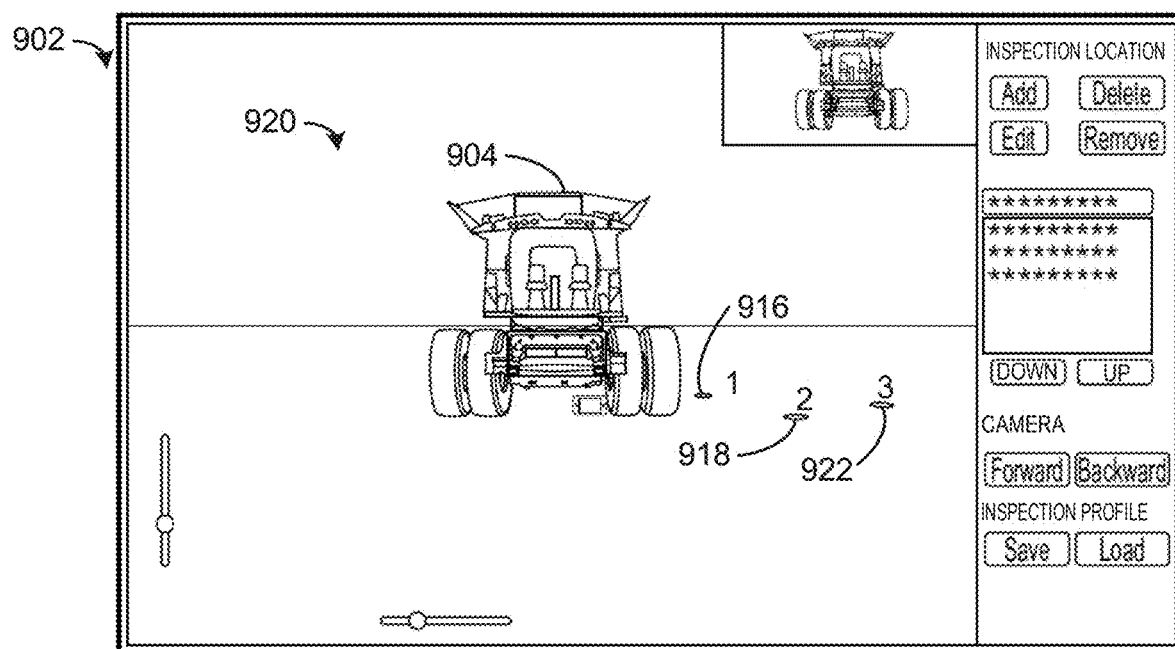
FIG. 9D is a fourth screenshot of the first interface of FIGS. 9A-9C, including an alternative view of the vehicle model associated with the inspection profile and including an example third inspection location.

FIG. 9D is a fourth screenshot of the first interface 902 of FIGS. 9A-9C, including an alternative view 920 of the vehicle model 904 associated with the inspection profile and including an example third inspection location 922. In the fourth screenshot of FIG. 9D, a user has manipulated the viewing perspective with respect to the vehicle model 904 to display a rear perspective of the vehicle model 904.

Figure 10A:
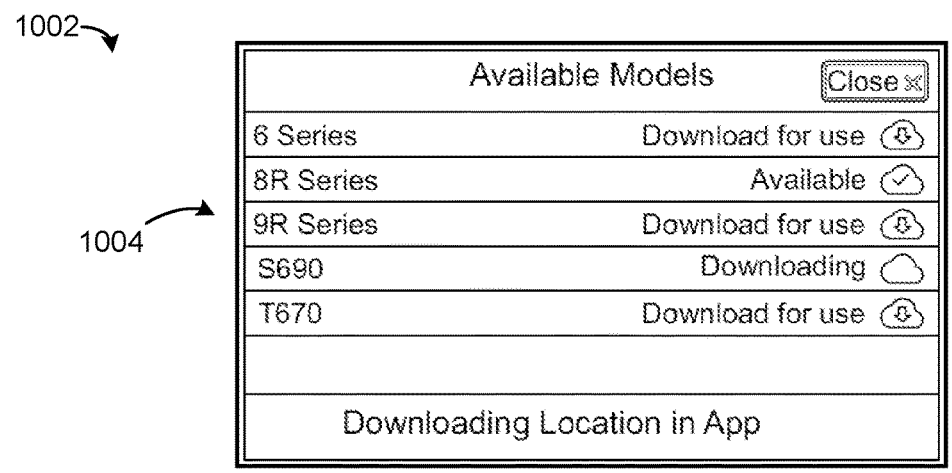
FIG. 10A is a first screenshot of an example second interface generated by the vehicle inspection controller to access a vehicle inspection profile and/or vehicle model.

FIG. 10A is a first screenshot of an example second interface 1002 generated by the vehicle inspection controller 212 to access a vehicle inspection profile and/or vehicle model. The first screenshot illustrates example inspection profiles 1004 that are available at the vehicle inspection controller 212. For example, the first row indicates that an inspection profile and/or vehicle model corresponding to a "6 series" is available for downloading. The second row indicates that an inspection profile and/or vehicle model for an "8R series" vehicle is available (e.g., already downloaded). In some examples, some rows may correspond to inspection profiles that are available (e.g., including inspection locations at which inspection images are to be captured), while some rows may correspond to vehicle models and/or vehicle part models that are available (e.g., with or without inspection profiles).

Figure 10B:
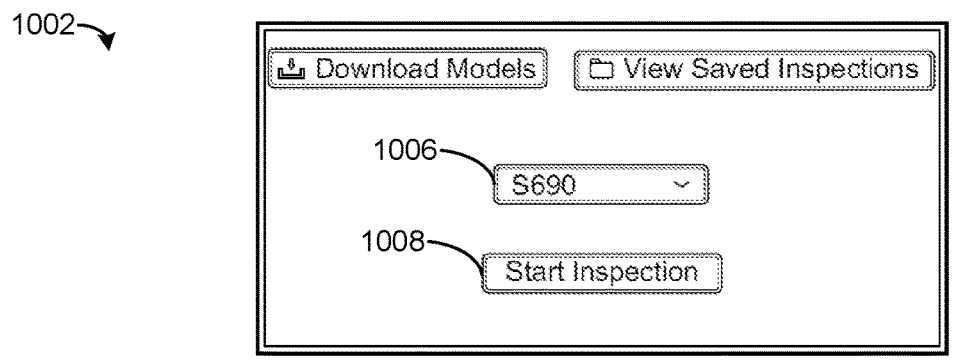
FIG. 10B is a second screenshot of the second interface of FIG. 10A configured to initiate an inspection.

FIG. 10B is a second screenshot of the second interface 1002 of FIG. 10A configured to initiate an inspection. The second screenshot illustrates an example inspection selection dropdown 1006 that can be utilized to select an inspection profile and an example start inspection button 1008 that can be utilized to begin a vehicle and/or vehicle part inspection.

Figure 10C:
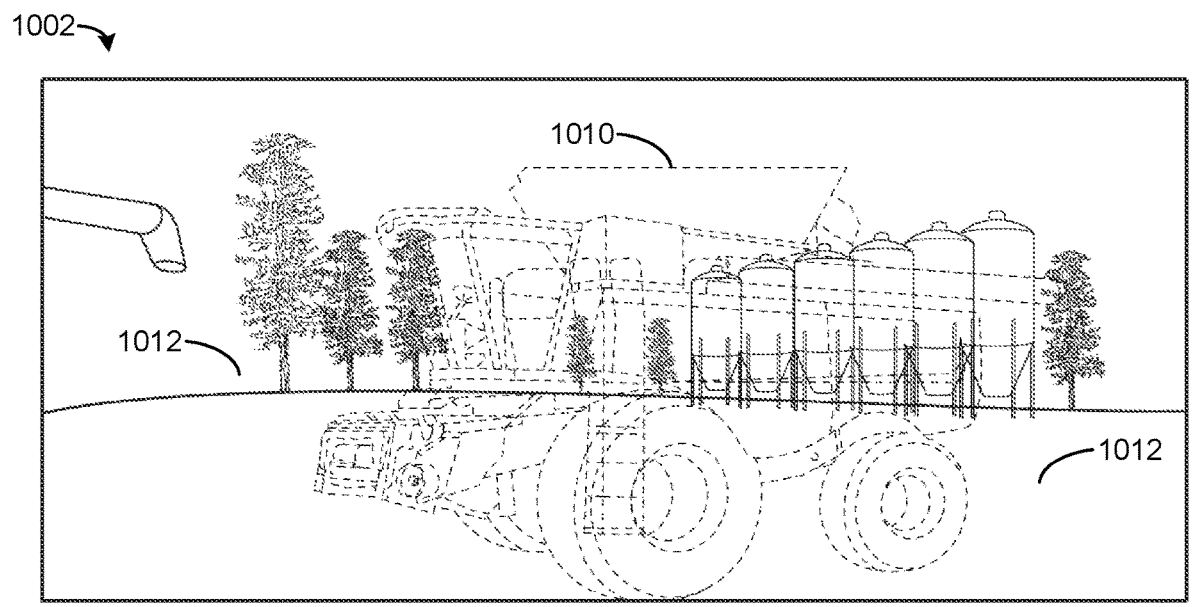
FIG. 10C is a third screenshot of the second interface of FIGS. 10A-10B during an initial alignment of an example outline of the vehicle model to identify a vehicle.

FIG. 10C is a third screenshot of the second interface 1002 of FIGS. 10A-10B during an initial alignment of an example outline 1010 of the vehicle model to identify a vehicle. In the third screenshot of FIG. 10C, example live camera data 1012 is visible, with the outline 1010 of the vehicle model placed on top of the live camera data 1012 (e.g., as an augmented reality overlay). As there is no vehicle visible in the live camera data 1012, a user adjusts the camera to find the vehicle and align the outline 1010 of the vehicle model with the vehicle to enable the vehicle inspection controller 212 to identify the vehicle in the live camera data 1012. In some examples, the live camera data 1012 may not be precisely live (e.g., due to processing delays and/or buffering).

Figure 10D:
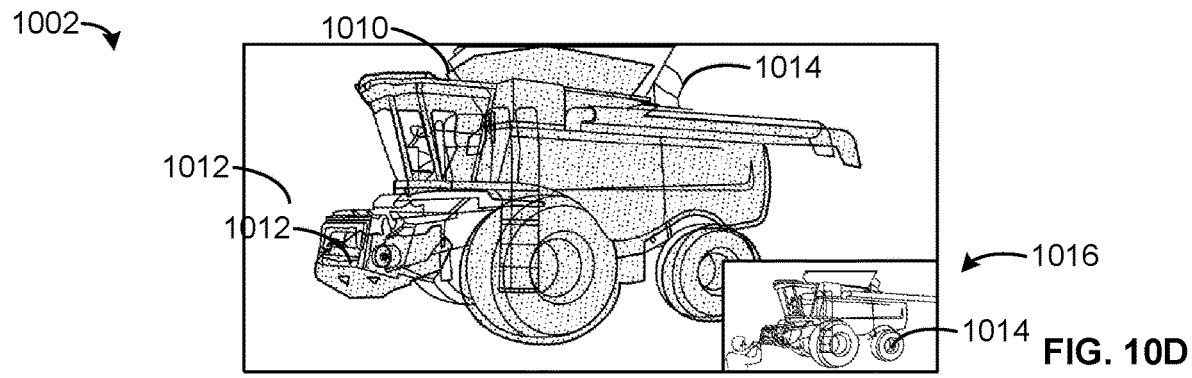
FIG. 10D is a fourth screenshot of the second interface of FIGS. 10A-10C when the outline of the vehicle model has been aligned with an example vehicle to be inspected.

FIG. 10D is a fourth screenshot of the second interface 1002 of FIGS. 10A-10C when the outline 1010 of the vehicle model has been aligned with an example vehicle 1014 to be inspected. In the illustrated example, the outline 1010 is substantially aligned (e.g., within a threshold amount of error) with the vehicle 1014. In some examples, the second interface 1002 displays a color and/or other indication on or within the outline 1010 to indicate the outline 1010 has been aligned with the vehicle 1014. Once the outline 1010 of the vehicle has been aligned with the vehicle 1014 in the live camera data 1012, the vehicle inspection controller 212 can determine that the vehicle to be inspected has been identified and begin generation and display of navigation instructions on the second interface 1002.

In the bottom right corner of FIG. 10D (e.g., as viewed on the page) is an example picture 1016 of a real-world environment at a time when the fourth screenshot is captured (e.g., a user is pointing the second device 210 at the vehicle 1014).

Figure 10E:
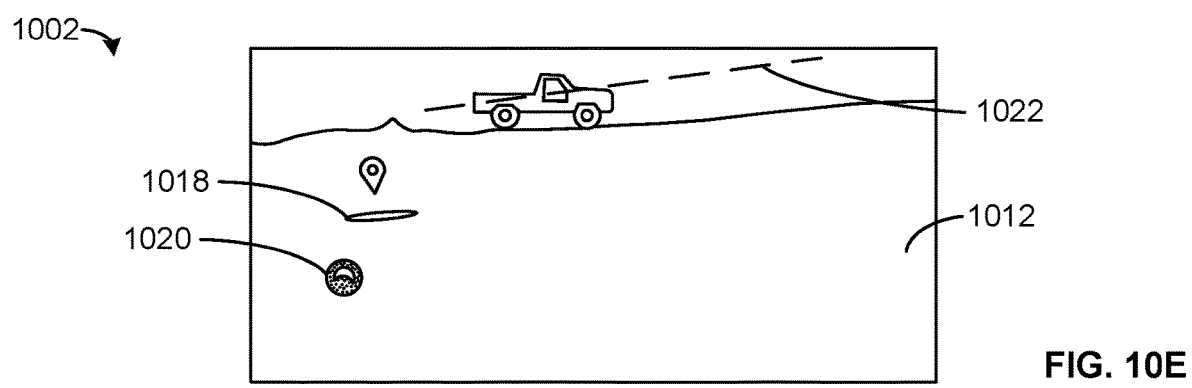
FIG. 10E is a fifth screenshot of the second interface of FIGS. 10A-10D during navigation to an example fifth inspection location.

FIG. 10E is a fifth screenshot of the second interface 1002 of FIGS. 10A-10D during navigation to an example fifth inspection location 1018. Following recognition of the vehicle 1014, as illustrated in FIG. 10D, the vehicle inspection controller 212 can initiate navigation to an inspection point in an inspection profile. The fifth inspection location 1018 is illustrated as an overlay including a circle at the location on the ground and a navigation bubble extending from the ground upward (e.g., away from the ground, vertically) at the fifth inspection location 1018. In some examples, any type of augmented reality overlay or other indication may be utilized to show a user the fifth inspection location 1018 over the live camera data 1012.

The fifth screenshot of the second interface 1002 further includes an example navigation arrow 1020 to guide a user to the fifth inspection location 1018. In some examples, when a user is not oriented toward the fifth inspection location 1018, or the fifth inspection location 1018 is otherwise obscured from the live camera data 1012, the navigation arrow 1020 can be utilized to cause the user to turn and move toward the fifth inspection location 1018.

The fifth screenshot of the second interface 1002 further includes an example line-of-sight indicator 1022. The line-of-sight indicator 1022 is an overlay on top of the live camera data 1012 illustrating a line extending from a point of interest associated with the current inspection location (e.g., the fifth inspection location 1018) to a camera location for the fifth inspection location 1018. The line-of-sight indicator 1022 can aide a user in orienting the camera 214 of the second device 210 toward the point of interest for the fifth inspection location 1018 once a user has arrived at the fifth inspection location 1018.

Figure 10F:
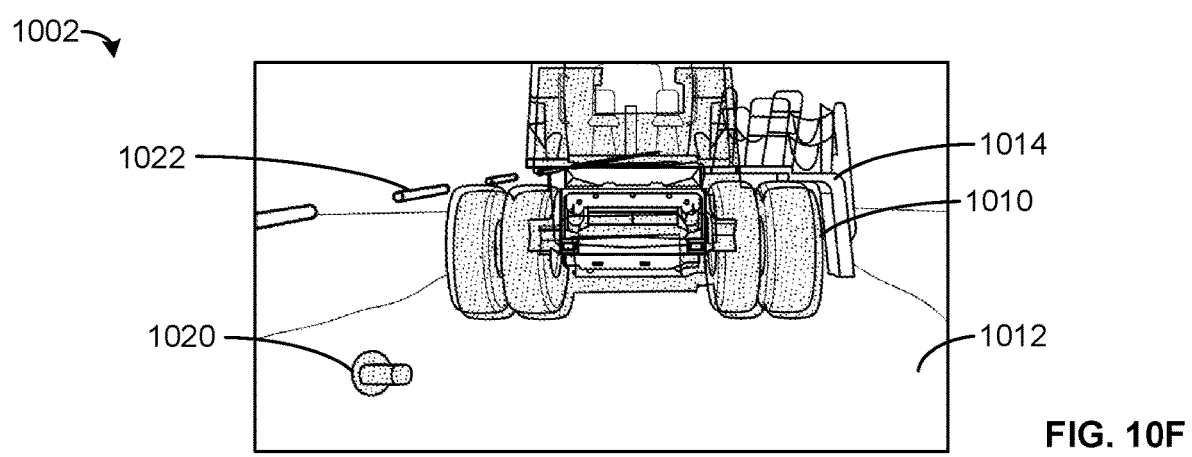
FIG. 10F is a sixth screenshot of the second interface of FIGS. 10A-10E prior to arrival at the fifth inspection location.

FIG. 10F is a sixth screenshot of the second interface 1002 of FIGS. 10A-10E prior to arrival at the fifth inspection location 1018. In the sixth screenshot, the navigation arrow 1020 indicates that the user should move forward and to the left (as viewed on the page) to arrive at the fifth inspection location 1018. Further, the line-of-sight indicator 1022 indicates that the camera should be positioned further to the left (as viewed on the page) to arrive at the correct camera position for the fifth inspection location 1018. In the sixth screenshot, the outline 1010 of the vehicle model is filled with a first shading, indicating that it is not properly aligned with the vehicle 1014 at the fifth inspection location 1018.

Figure 10G:
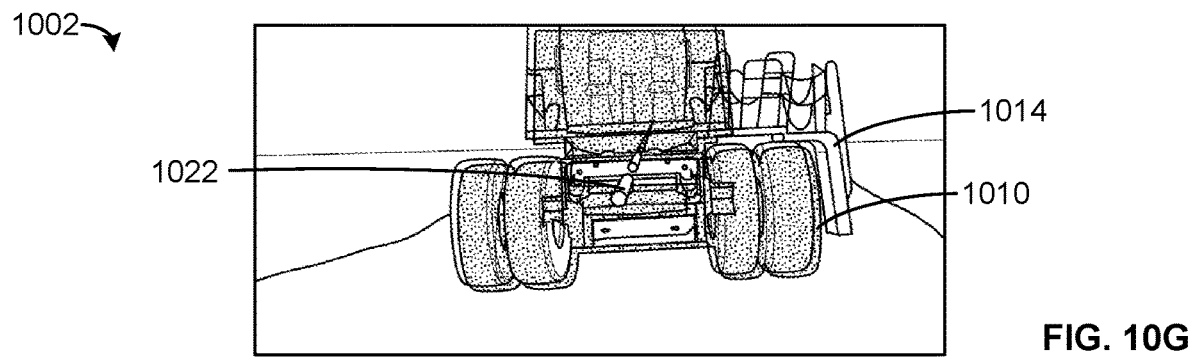
FIG. 10G is a seventh screenshot of the second interface of FIGS. 10A-F when the device is positioned at the fifth inspection location.

FIG. 10G is a seventh screenshot of the second interface 1002 of FIGS. 10A-F when the device is positioned at the fifth inspection location 1018. In the seventh screenshot, the outline 1010 of the vehicle model is filled with a second, darker shading, indicating that the outline 1010 is properly aligned with the vehicle 1014 at the fifth inspection location 1018. Any indication may be utilized to inform a user that the camera 214 is properly positioned to capture an inspection image. Further, in the seventh screenshot, the line-of-sight indicator 1022 is pointing almost directly at the vehicle 1014, indicating that the camera is positioned to capture the inspection image.

Figure 10H:
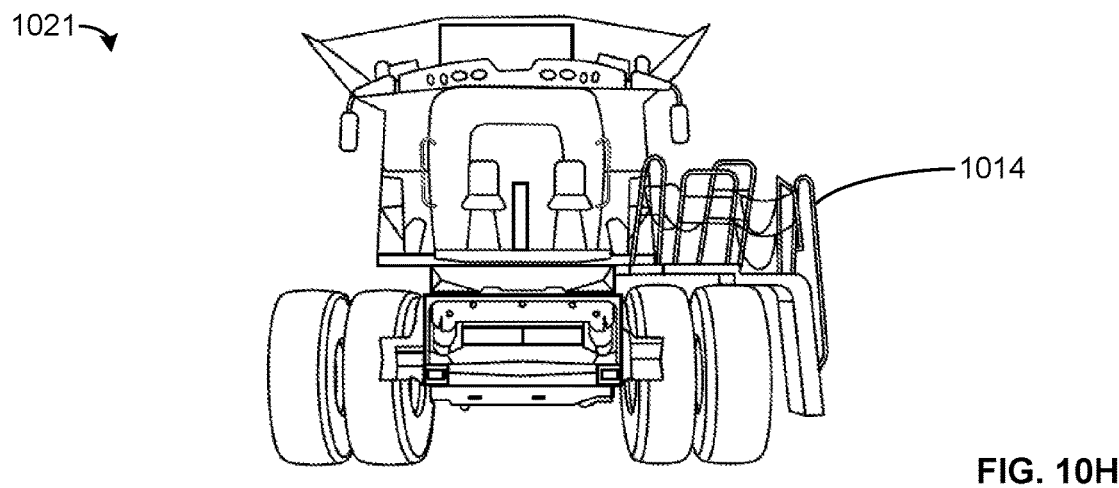
FIG. 10H is an example inspection image taken from fifth inspection location of FIG. 10G, illustrating a front view of the vehicle.

FIG. 10H is an example inspection image 1021 taken from fifth inspection location 1018 of FIG. 10G, illustrating a front view of the vehicle 1014.

Figure 10I:
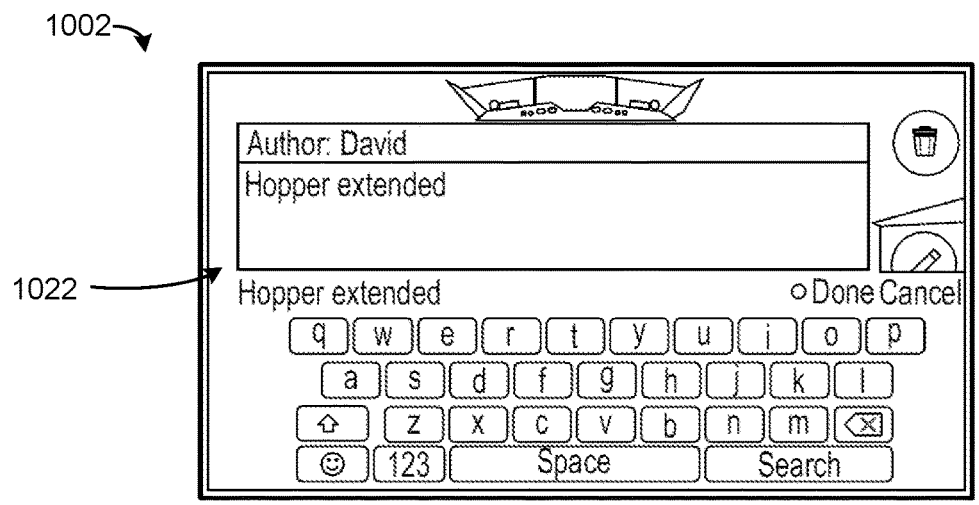
FIG. 10I is an example annotation entry entered in the second interface of FIGS. 10A-G to annotate the inspection image illustrated in FIG. 10H.

FIG. 10I is an example annotation entry entered in the second interface 1002 of FIGS. 10A-G to annotate the inspection image 1021 illustrated in FIG. 10H. In some examples, following the capture of the inspection image 1021, the second interface 1002 prompts a user to enter an annotation. The annotation may include a title, description, an author, and/or any other relevant information to be stored with the inspection image in the inspection data.

Figure 10J:
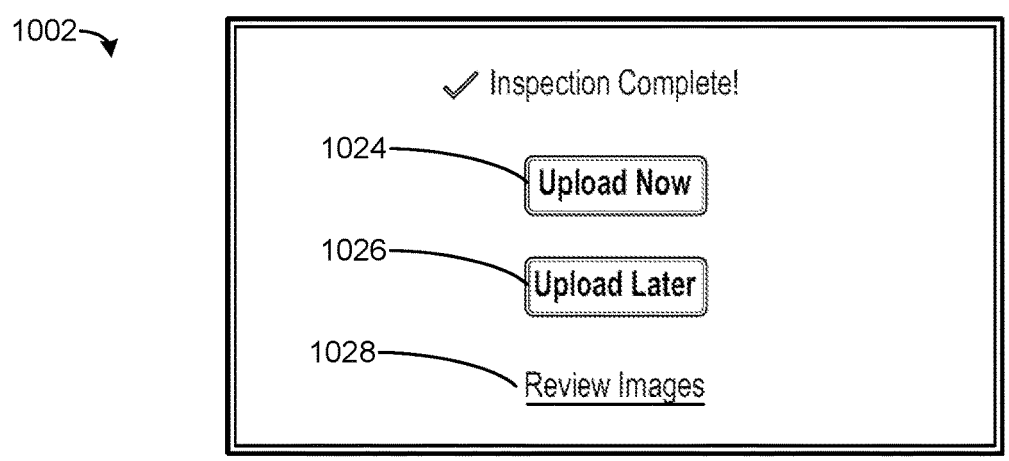
FIG. 10J is an example upload screen of the second interface of FIGS. 10A-G and 10I to upload inspection data.

FIG. 10J is an example upload screen of the second interface 1002 of FIGS. 10A-G and 10I to upload inspection data. The upload screen includes an example upload now button 1024, to upload inspection data (e.g., to the cloud, to a third-party, etc.), as well as an example upload later button 1026, to upload inspection data at a later time. For example, the vehicle inspection controller 212 may remind a user to upload inspection data at regular intervals if the user selects the upload later button 1026. The upload screen further includes an example review images option 1028, enabling a user to view inspection images which have been captured. In some examples, the review images option 1028 retrieves images corresponding to a current inspection. In some examples, the review images option 1028 allows a user to access inspection images from past inspections.

Figure 11A:
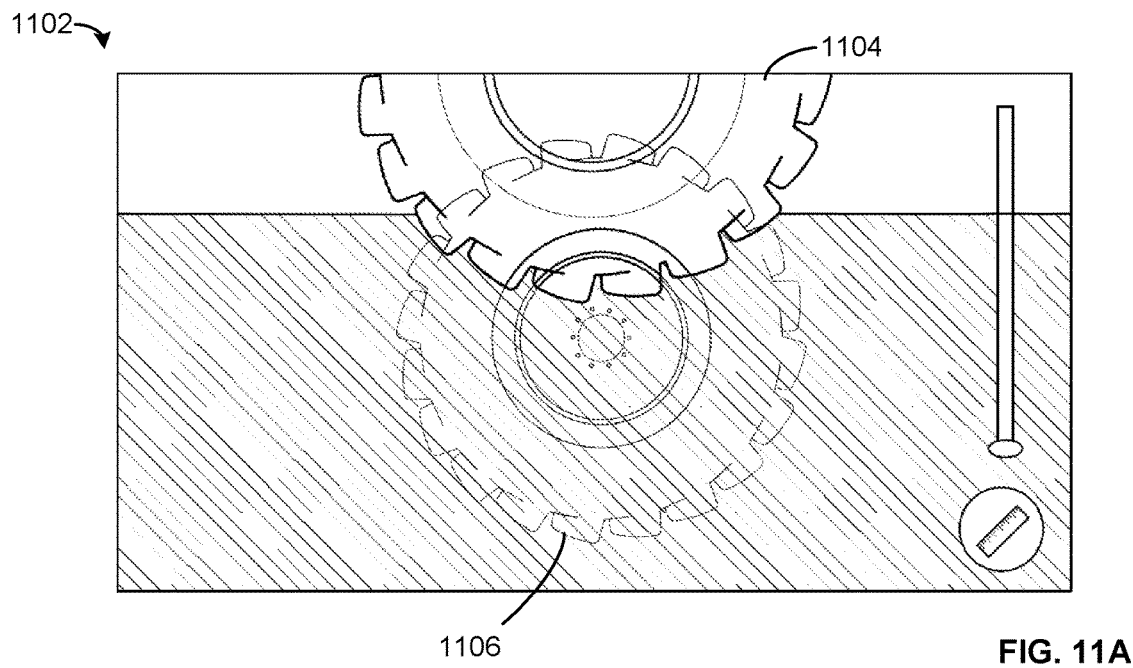
FIG. 11A is a first screenshot of an example third interface to align an example vehicle part outline with an example vehicle part (e.g., a tire) to conduct a vehicle part inspection.

FIG. 11A is a first screenshot of an example third interface 1102 to align an example vehicle part outline 1106 with an example vehicle part 1104 (e.g., a tire) to conduct a vehicle part inspection. In some examples, a user may first perform a vehicle recognition procedure (e.g., as illustrated in FIG. 10C) and/or be navigate to a specific inspection location (e.g., as illustrated in FIGS. 10D-1F) prior to conducting the vehicle part inspection.

The vehicle part outline 1106 of FIG. 11A represents an outline of a model of a tire. The vehicle part outline 1106 is presented as an overlay displayed centrally over camera data to enable the vehicle inspection controller 212 to identify the vehicle part (e.g., the tire).

Figure 11B:
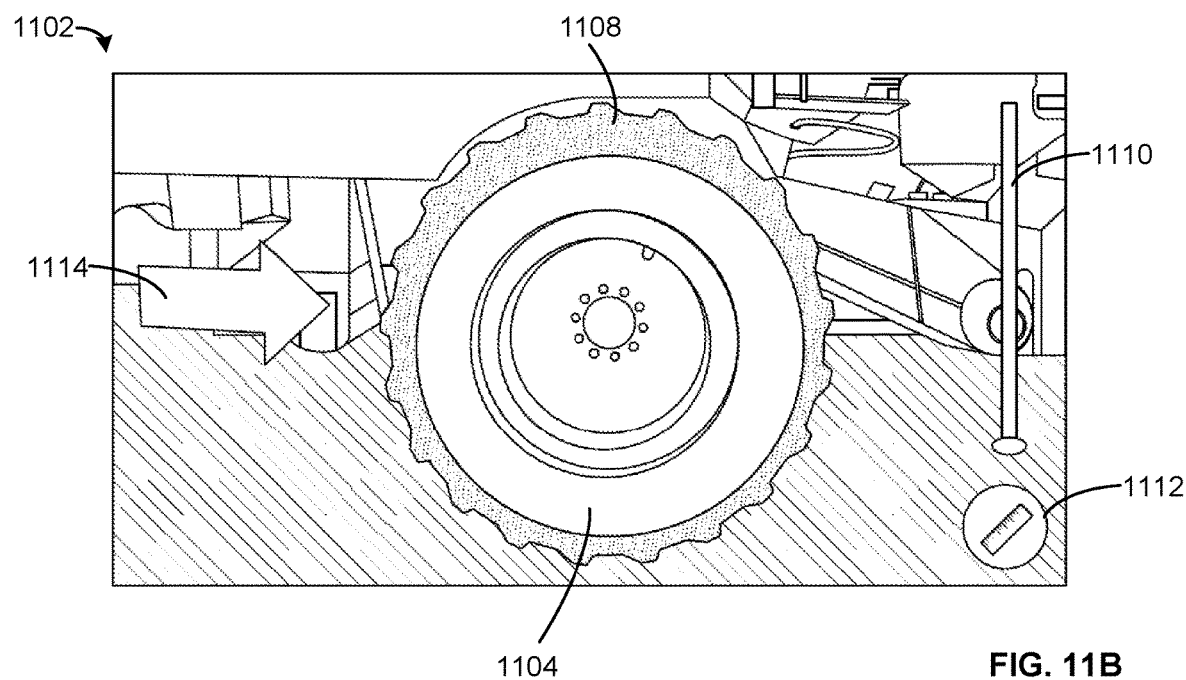
FIG. 11B is a second screenshot of the third interface of FIG. 11A following identification of the vehicle part.

FIG. 11B is a second screenshot of the third interface 1102 of FIG. 11A following identification of the vehicle part 1104. After the vehicle part 1104 has been identified, an example measurement overlay 1108 is displayed over the vehicle part 1104 to measure a dimension of the vehicle part 1104. In the illustrated example of FIG. 11B, the measurement overlay 1108 measures an outer diameter of the vehicle part 1104.

The third interface 1102 of the illustrated example further includes an example overlay size slider 1110 which can be utilized to adjust the size of the measurement overlay 1108 to enable measurements after the vehicle part 1104 has been identified. The third interface 1102 of the illustrated example further includes an example measure button 1112 which can be utilized to capture a measurement based on the measurement overlay 1108. For example, once a user has adjusted the measurement overlay 1108 to match the outer diameter of the vehicle part 1104, the vehicle inspection controller 212 can (e.g., in response to the measure button 1112 being selected) determine, based on (1) a distance between the vehicle part 1104 and the camera 214, (2) a size of the measurement overlay 1108, and/or (3) one or more camera characteristics of the camera 214 (e.g., a focal length), a measurement of the vehicle part 1104.

FIG. 11B further includes an example first arrow 1114 indicating that a user should move to a left side (e.g., as viewed on the page) of the vehicle part 1104 to take a measurement.

Figure 11C:
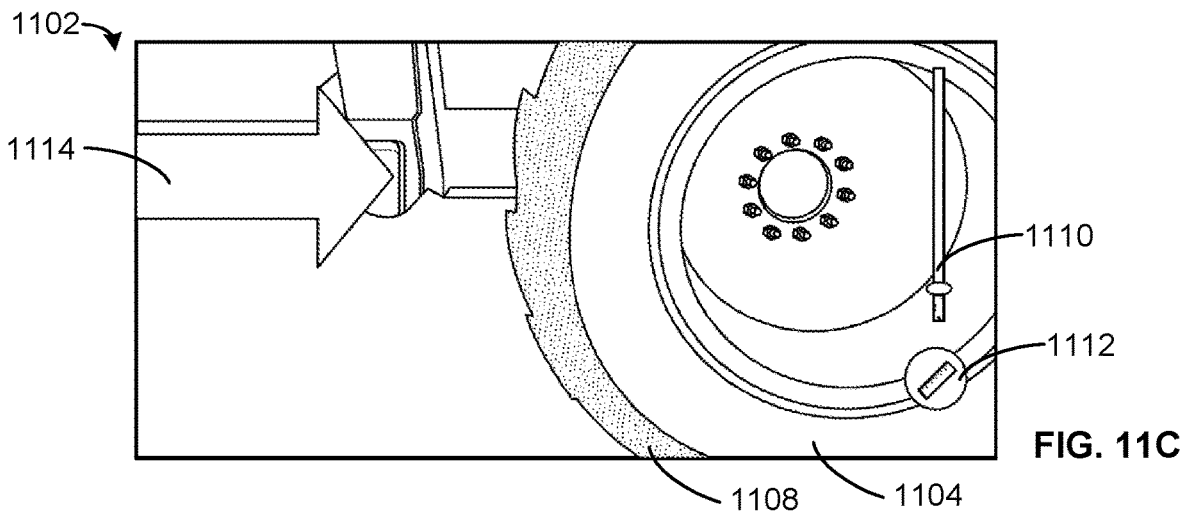
FIG. 11C is a third screenshot of the third interface of FIGS. 11A-11B to perform a first measurement of the vehicle part after the user has moved the camera to focus on the area indicated by the first arrow.

FIG. 11C is a third screenshot of the third interface 1102 of FIGS. 11A-11B to perform a first measurement of the vehicle part 1104 after the user has moved the camera 214 to focus on the area indicated by the first arrow 1114. After the user has aligned the measurement overlay 1108 with the vehicle part 1104, the user can select the measure button 1112 to store a measurement.

Figure 11D:
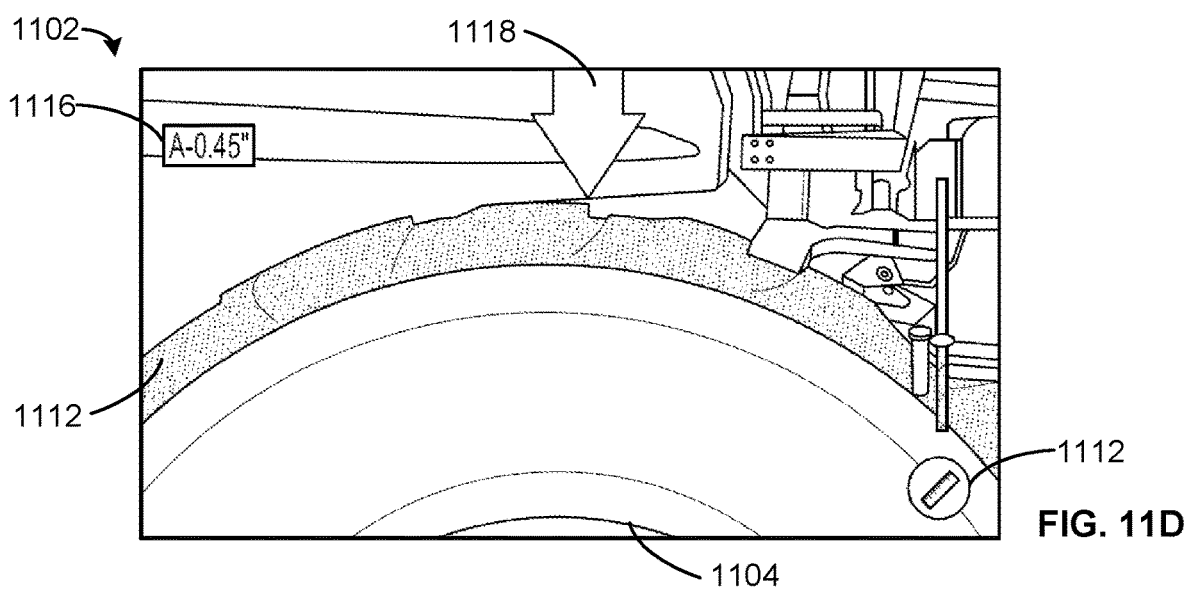
FIG. 11D is a fourth screenshot of the third interface of FIGS. 11A-11C to perform a second measurement of the vehicle part.

FIG. 11D is a fourth screenshot of the third interface 1102 of FIGS. 11A-11C to perform a second measurement of the vehicle part 1104. In the fourth screenshot of FIG. 11D, an example first measurement 1116 corresponding to the first measurement captured at the first arrow 1114 is displayed. In some examples, the first measurement 1116 appears when the measure button 1112 is pressed. Following the first measurement at the first arrow 1114, an example second arrow 1118 directs the user to a second location to measure, at the top (e.g., in the direction on the page) of the vehicle part 1104. The user can repeat the same measurement technique, aligning the measurement overlay 1108 with the vehicle part 1104.

Figure 11E:
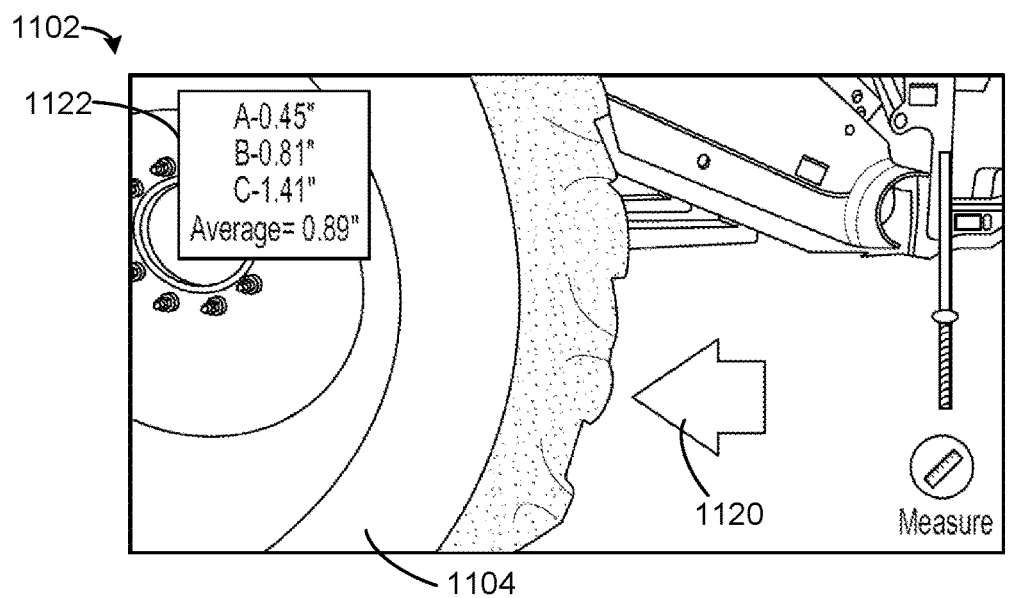
FIG. 11E is a fifth screenshot of the third interface of FIGS. 11A-11D to perform a third measurement of the vehicle part.

FIG. 11E is a fifth screenshot of the third interface 1102 of FIGS. 11A-11D to perform a third measurement of the vehicle part 1104. For the third measurement, an example third arrow 1120 is displayed to cause a user to move the camera to the right side (e.g., as viewed on the page) of the vehicle part 1104. The fifth screenshot illustrates the third interface 1102 after the third measurement is completed, as an example full measurement set 1122 is illustrated on the third interface 1102. The full measurement set 1122 includes the first measurement (A=0.45", B=0.81", C=1.41", Average=0.89").

While the illustrated examples of FIG. 11A-D for measuring a vehicle part illustrate measurement of a dimension of a tire, any number of other measurements and/or analyses may be conducted by the vehicle inspection controller 212. For example, part damage may be determined by image analysis relative to other parts.

Figure 12A:
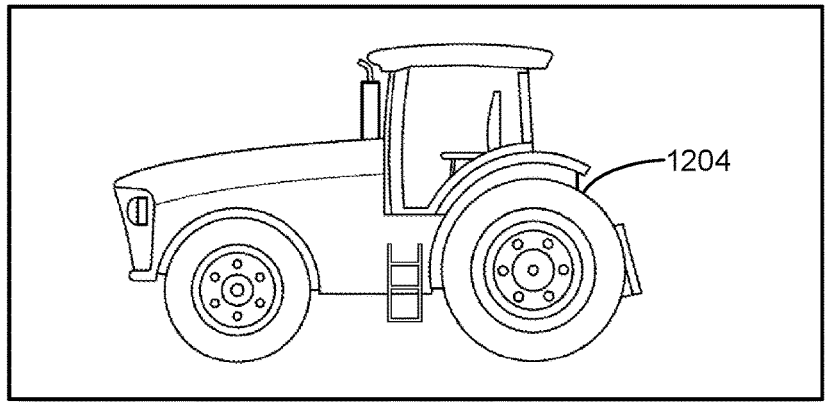
FIG. 12A is a first screenshot of an example fourth interface illustrating an example vehicle model to be utilized for a user to request vehicle part information.

FIG. 12A is a first screenshot of an example fourth interface 1202 illustrating an example vehicle model 1204 to be utilized for a user to request vehicle part information. In some examples, a user can retrieve the vehicle model 1204 by performing a vehicle identification procedure (e.g. as illustrated in FIGS. 10C-D). For example, if a user wants to retrieve part information and/or part ordering information for a vehicle that they do not confidently know the part number for, they can utilize a vehicle identification technique to identify the vehicle and thereafter retrieve a model that can be manipulated to select a specific part. In some examples, the vehicle inspection controller 212 compares a plurality of vehicle models and/or representations of vehicle models (e.g., outlines) with camera data to identify a vehicle.

In some examples, after the vehicle inspection controller 212 identifies a vehicle, it determines an orientation of the vehicle and displays the vehicle model 1204 corresponding to the identified vehicle in the same orientation as the identified vehicle. For example, if a user is looking at a rear-side of a vehicle because the user has identified a potential maintenance problem, the user can perform an identification of the vehicle and retrieve the vehicle model 1204 in the same orientation as they are looking at the vehicle in real life. In some examples, the vehicle model 1204 can be manipulated (e.g., rotated, enlarged, etc.) to allow a user to view different parts of the vehicle model 1204. In some examples, vehicle parts on the vehicle model 1204 are selectable.

Figure 12B:
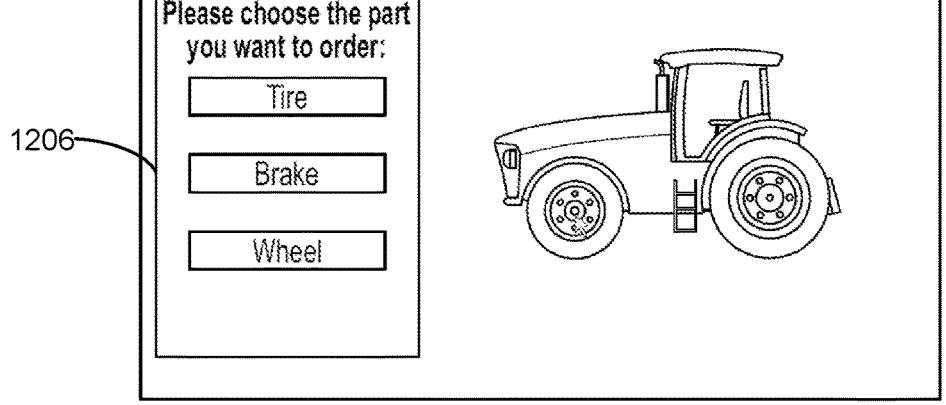
FIG. 12B is a second screenshot of the fourth interface of FIG. 12A illustrating an example vehicle part ordering menu.

FIG. 12B is a second screenshot of the fourth interface 1202 of FIG. 12A illustrating an example vehicle part ordering menu 1206. The vehicle part ordering menu 1206 enables a user to select a part to be ordered and/or to retrieve maintenance information. In the illustrated example, the user can select a part from a list on the vehicle part ordering menu 1206. In some examples, a user can select a part on the vehicle model 1204 to retrieve part information and/or part ordering information.

Figure 12C:
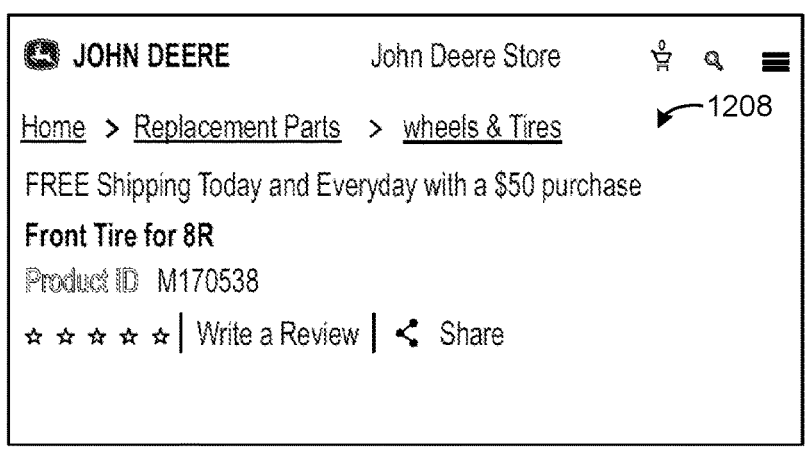
FIG. 12C is a third screenshot of the fourth interface of FIGS. 12A-12B illustrating an example vehicle part ordering system.

FIG. 12C is a third screenshot of the fourth interface 1202 of FIGS. 12A-12B illustrating an example vehicle part ordering system 1208. The vehicle part ordering system 1208 allows a user to order a replacement part. In some examples, the vehicle part ordering system 1208 navigates a user to a website location in a web browser. In some examples, in addition to or alternatively to the vehicle part ordering system 1208, the user may access vehicle part information (e.g., specifications, user manuals, guided augmented reality maintenance procedures, etc.) when a part is selected from the vehicle part ordering menu 1206 or by selecting the part on the vehicle model 1204.

Figure 13:
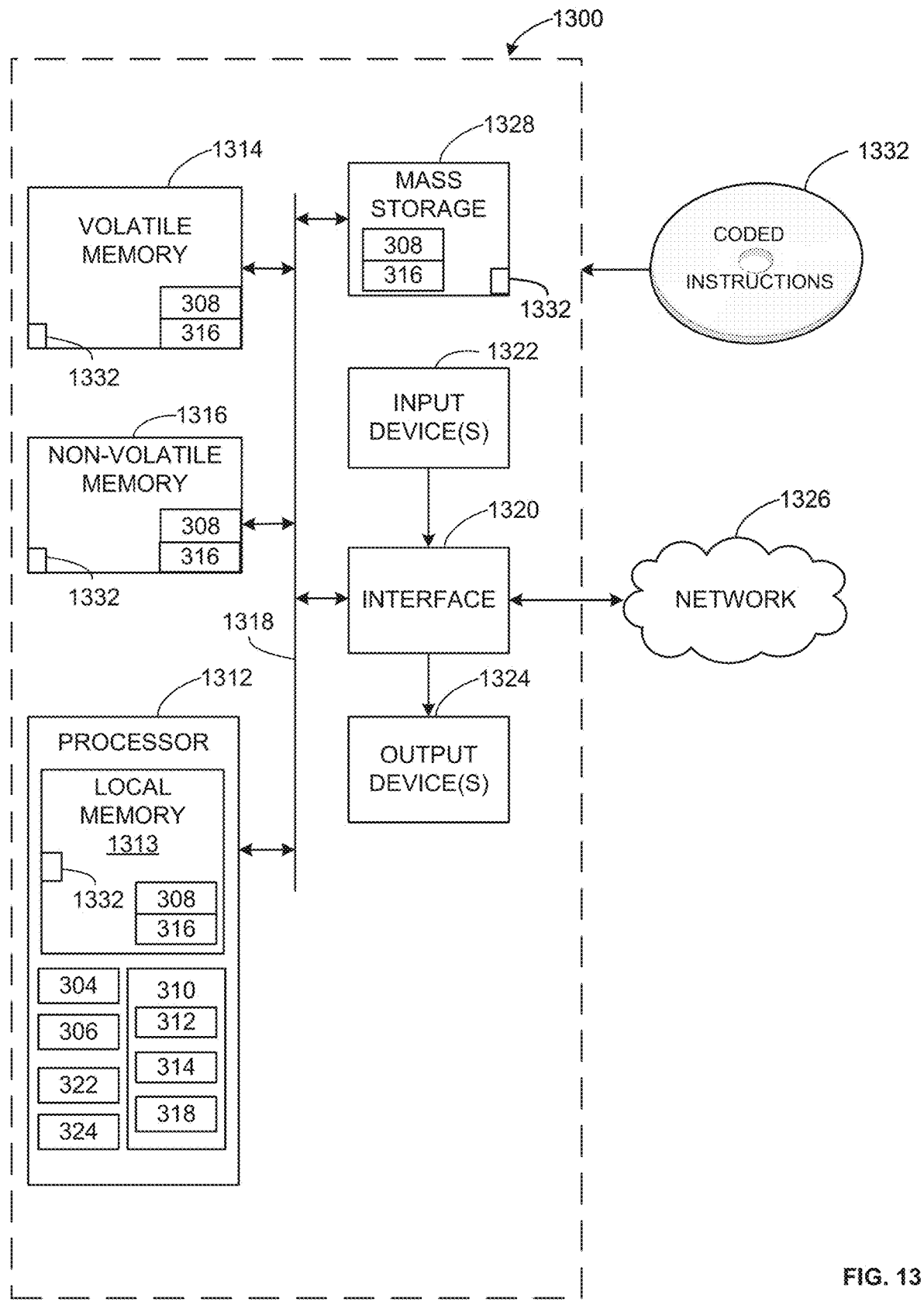
FIG. 13 is a block diagram of an example processor platform structured to execute the example machine readable instructions of FIG. 5 to implement the inspection manager of FIG. 3.

FIG. 13 is a block diagram of an example processor platform 1300 structured to execute the instructions of FIG. 5 to implement the inspection manager 204 of FIGS. 2-3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user input receiver 304, the example model accessor 306, the example model data store 308, the example inspection profile generator 310, the example inspection location manager 312, the example camera-independent location generator 314, the example inspection profile data store 316, the example inspection profile transmitter 318, the example projected camera view generator 322, and/or the example user interface configurator 324.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1308 include floppy disk drives, hard drive disks, compact disk drives, Blu-ray disk drives, redundant array of independent disks (RAID) systems, and digital versatile disk (DVD) drives.

The machine executable instructions 1332, 500 of FIG. 5 may be stored in the mass storage device 1328, in the volatile memory 1314, in the non-volatile memory 1316, and/or on a removable non-transitory computer readable storage medium such as a CD or DVD.

Figure 14:
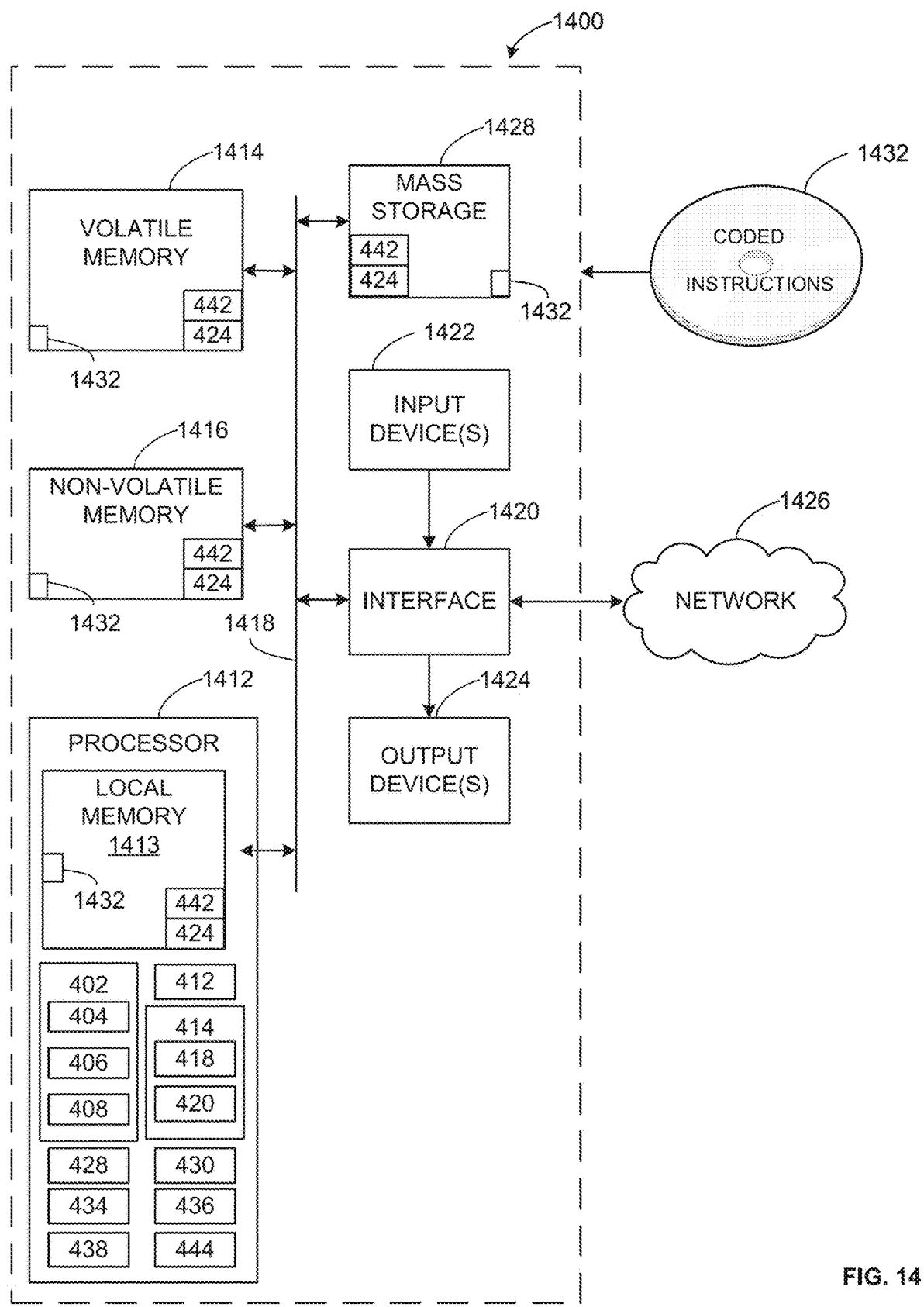
FIG. 14 is a block diagram of an example processor platform structured to execute the example machine readable instructions of FIGS. 6A, 6B, 7, and 8 to implement the vehicle inspection controller of FIG. 4.

FIG. 14 is a block diagram of an example processor platform 1400 structured to execute the instructions of FIGS. 6A, 6B, 7 and 8 to implement the vehicle inspection controller 212 of FIGS. 2 and 4. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example inspection profile manager 402, the example inspection profile accessor 404, the example device-specific location translator 406, the example navigation generator 408, the example model manager 412, the example image manager 414, the example image comparator 418, the example metadata manager 420, the example image data store 424, the example location analyzer 428, the example inspection image analyzer 430, the example user input accessor 434, the example part information manager 436, the example interface generator 438, the example inspection data store 442 and/or the example inspection data transmitter 444.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 6A, 6B, 7 and 8 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that improve the functioning of a mobile device with a camera when conducting an inspection and/or analysis of a vehicle and/or vehicle part. For example, example techniques herein enable a mobile device to guide a user of any experience level through a repeatable inspection procedure. Further, example techniques disclosed herein improve the ability of a computer to generate inspection profiles by enabling the generation of inspection locations that are camera-independent. Such example techniques further improve the mobile device's ability to perform the inspection by translating the camera-independent location coordinates to device-specific locations that can be easily utilized to guide a user to a location to capture an inspection photo. The disclosed methods, apparatus and articles of manufacture are accordingly directed to one or more improvement(s) in the functioning of a computer.

Example methods, apparatus, systems, and articles of manufacture for augmented reality measuring of equipment are disclosed herein. Further examples and combinations thereof include the following:

Example 1 includes an apparatus comprising an image comparator to compare camera data with reference information of a reference vehicle part to identify a vehicle part included in the camera data, and an inspection image analyzer to, in response to the image comparator identifying the vehicle part, measure the vehicle part by causing an interface generator to generate an overlay representation of the reference vehicle part on the camera data displayed on a user interface, and determining, based on one or more user inputs to adjust the overlay representation, a measurement corresponding to the vehicle part.

Example 2 includes the apparatus of example 1, wherein the inspection image analyzer is to, when prior inspection data for the vehicle part exists, compare the measurement corresponding to the vehicle part with a prior measurement corresponding to the vehicle part in the prior inspection data.

Example 3 includes the apparatus of example 2, wherein the inspection image analyzer is to determine a wear metric based on the comparison of the measurement with the prior measurement.

Example 4 includes the apparatus of example 1, further including an inspection data transmitter to transmit the measurement or a wear metric based on the measurement to an inspection manager.

Example 5 includes the apparatus of example 1, further including an inspection profile manager to access an inspection profile corresponding to the vehicle part, and generate a navigation instruction to cause a user to move to position the camera at a location to view the vehicle part based on the inspection profile and a location of the camera.

Example 6 includes the apparatus of example 1, wherein the vehicle part is a tire, the overlay representation is a circular overlay, the inspection image analyzer to determine at least one of a diameter of the tire, radius of the tire, tread depth of the tire, or a thickness of the tire based on the one or more user inputs to adjust the circular overlay.

Example 7 includes the apparatus of example 1, wherein the inspection image analyzer is to, when prior inspection data for the vehicle part exists, generate predictive analytics based on an analyses of the prior inspection data for the vehicle part, the predictive analytics associated with a prediction of an amount of time for a measure of wear to occur.

Example 8 includes a non-transitory computer readable storage medium comprising instructions that, when executed, cause a processor to at least compare camera data with reference information of a reference vehicle part to identify a vehicle part included in the camera data, and in response to identifying the vehicle part, measure the vehicle part by generating an overlay representation of the reference vehicle part over the camera data displayed on a user interface, and determining, based on one or more user inputs to adjust the overlay representation, a measurement corresponding to the vehicle part.

Example 9 includes the non-transitory computer readable storage medium of example 8, wherein, when prior inspection data for the vehicle part exists, the instructions, when executed, cause the processor to compare the measurement corresponding to the vehicle part with a prior measurement corresponding to the vehicle part in the prior inspection data.

Example 10 includes the non-transitory computer readable storage medium of example 9, wherein the instructions, when executed, cause the processor to determine a wear metric based on the comparison of the measurement with the prior measurement.

Example 11 includes the non-transitory computer readable storage medium of example 8, wherein the instructions, when executed, cause the processor to transmit the measurement or a wear metric based on the measurement to an inspection manager.

Example 12 includes the non-transitory computer readable storage medium of example 8, wherein the instructions, when executed, cause the processor to access an inspection profile corresponding to the vehicle part, and generate a navigation instruction to cause a user to move to position the camera at a location to view the vehicle part based on the inspection profile and a location of the camera.

Example 13 includes the non-transitory computer readable storage medium of example 8, wherein the vehicle part is a tire, the overlay representation is a circular overlay, the instructions, when executed, cause the processor to determine at least one of a diameter of the tire, radius of the tire, tread depth of the tire, or a thickness of the tire based on the one or more user inputs to adjust the circular overlay.

Example 14 includes the non-transitory computer readable storage medium of example 8, wherein the instructions, when executed, cause the processor to, when prior inspection data for the vehicle part exists, generate predictive analytics based on an analyses of the prior inspection data for the vehicle part, the predictive analytics associated with a prediction of an amount of time for a measure of wear to occur.

Example 15 includes a method comprising comparing camera data with reference information of a reference vehicle part to identify a vehicle part included in the camera data, and measuring, in response to identifying the vehicle part, the vehicle part by causing an interface generator to generate an overlay representation of the reference vehicle part on the camera data displayed on a user interface, and determining, based on one or more user inputs to adjust the overlay representation, a measurement corresponding to the vehicle part.

Example 16 includes the method of example 15, further including comparing, when prior inspection data for the vehicle part exists, the measurement corresponding to the vehicle part with a prior measurement corresponding to the vehicle part in the prior inspection data.

Example 17 includes the method of example 16, further including determining a wear metric based on the comparison of the measurement with the prior measurement.

Example 18 includes the method of example 15, further including transmitting the measurement or a wear metric based on the measurement to an inspection manager.

Example 19 includes the method of example 15, further including accessing an inspection profile corresponding to the vehicle part, and generating a navigation instruction to cause a user to move to position the camera at a location to view the vehicle part based on the inspection profile and a location of the camera.

Example 20 includes the method of example 15, wherein the vehicle part is a tire, the overlay representation is a circular overlay, and further including determining at least one of a diameter of the tire, radius of the tire, tread depth of the tire, or a thickness of the tire based on the one or more user inputs to adjust the circular overlay. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    an image comparator to compare camera data with reference information of a reference vehicle part to identify a vehicle part included in the camera data; and
    an inspection image analyzer to, in response to the image comparator identifying the vehicle part as a tire:
        cause an interface generator to generate an overlay representation of the reference vehicle part on the camera data displayed on a user interface; and
        determine based on one or more user inputs to adjust the overlay representation, a measurement of the vehicle part corresponding to at least one of a diameter, a radius, a tread depth, or a thickness.

2. The apparatus of claim 1, wherein the inspection image analyzer is to, when prior inspection data for the vehicle part exists, compare the measurement corresponding to the vehicle part with a prior measurement corresponding to the vehicle part in the prior inspection data.

3. The apparatus of claim 2, wherein the inspection image analyzer is to determine a wear metric of the vehicle part based on the comparison of the measurement with the prior measurement.

4. The apparatus of claim 1, further including an inspection profile manager to, responsive to identifying an inspection profile including a first inspection location corresponding to the vehicle part, determine whether a second inspection location corresponding to the vehicle part is available.

5. The apparatus of claim 1, further including an inspection profile manager to:
    access an inspection profile corresponding to the vehicle part; and
    generate a navigation instruction to cause a user to move to position a camera at a location to view the vehicle part based on the inspection profile and a location of the camera.

6. The apparatus of claim 1, further including model management circuitry to identify the reference information by selecting an available model from a plurality of available models.

7. The apparatus of claim 1, wherein the inspection image analyzer is to, when prior inspection data for the vehicle part exists, generate predictive analytics based on an analyses of the prior inspection data for the vehicle part, the predictive analytics associated with a prediction of an amount of time for a measure of wear to occur.

8. A non-transitory computer readable storage medium comprising instructions that, when executed, cause a processor to at least:
    compare camera data with reference information of a reference vehicle part to identify a vehicle part included in the camera data; and
    in response to identifying the vehicle part as a tire:
        generate an overlay representation of the reference vehicle part over the camera data displayed on a user interface; and
        determine, based on one or more user inputs to adjust the overlay representation, a measurement of the vehicle part corresponding to at least one of a diameter, a radius, a tread depth, or a thickness.

9. The non-transitory computer readable storage medium of claim 8, wherein, when prior inspection data for the vehicle part exists, the instructions, when executed, cause the processor to compare the measurement corresponding to the vehicle part with a prior measurement corresponding to the vehicle part in the prior inspection data.

10. The non-transitory computer readable storage medium of claim 9, wherein the instructions, when executed, cause the processor to determine a wear metric of the vehicle part based on the comparison of the measurement with the prior measurement.

11. The non-transitory computer readable storage medium of claim 8, wherein the instructions, when executed, cause the processor to transmit the measurement or a wear metric based on the measurement to an inspection manager.

12. The non-transitory computer readable storage medium of claim 8, wherein the instructions, when executed, cause the processor to:
    access an inspection profile corresponding to the vehicle part; and
    generate a navigation instruction to cause a user to move to position a camera at a location to view the vehicle part based on the inspection profile and a location of the camera.

13. The non-transitory computer readable storage medium of claim 8, wherein the instructions, when executed, cause the processor to identify the reference information by selecting an available model from a plurality of available models.

14. The non-transitory computer readable storage medium of claim 8, wherein the instructions, when executed, cause the processor to, when prior inspection data for the vehicle part exists, generate predictive analytics based on an analyses of the prior inspection data for the vehicle part, the predictive analytics associated with a prediction of an amount of time for a measure of wear to occur.

15. A method comprising:
   comparing camera data with reference information of a reference vehicle part to identify a vehicle part included in the camera data; and
   measuring, in response to identifying the vehicle part as a tire, the vehicle part by:
      causing an interface generator to generate an overlay representation of the reference vehicle part on the camera data displayed on a user interface; and
      determining, based on one or more user inputs to adjust the overlay representation, a measurement of the vehicle part corresponding to at least one of a diameter, a radius, a tread depth, or a thickness.

16. The method of claim 15, further including comparing, when prior inspection data for the vehicle part exists, the measurement corresponding to the vehicle part with a prior measurement corresponding to the vehicle part in the prior inspection data.

17. The method of claim 16, further including determining a wear metric of the vehicle part based on the comparison of the measurement with the prior measurement.

18. The method of claim 15, further including, responsive to identifying an inspection profile including a first inspection location corresponding to the vehicle part, determining whether a second inspection location corresponding to the vehicle part is available.

19. The method of claim 15, further including:
   accessing an inspection profile corresponding to the vehicle part; and
   generating a navigation instruction to cause a user to move to position a camera at a location to view the vehicle part based on the inspection profile and a location of the camera.

20. The method of claim 15, further including identifying the reference information by selecting an available model from a plurality of available models.

* * * * *